(12) United States Patent
Rajagopalan

(10) Patent No.: US 6,245,862 B1
(45) Date of Patent: **\*Jun. 12, 2001**

(54) GOLF BALLS COMPRISING SULFONATED OR PHOSPHONATED IONOMERS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/086,263

(22) Filed: May 28, 1998

Related U.S. Application Data

(63) Continuation-in-part of application No. 08/815,659, filed on Mar. 13, 1997, now Pat. No. 6,187,864, which is a continuation-in-part of application No. 08/862,831, filed on May 23, 1997, now Pat. No. 5,981,654.

(51) Int. Cl.$^7$ .......................... A63B 37/12; A63B 37/02; A63B 37/00

(52) U.S. Cl. .......................... 525/340; 525/344; 525/353; 528/287; 528/290; 528/295; 528/71; 528/72; 473/373; 473/374; 473/378; 473/385

(58) Field of Search .................................. 473/373, 374, 473/378, 385; 525/340, 344, 353; 528/287, 290, 295, 72, 71

(56) References Cited

U.S. PATENT DOCUMENTS

| | | |
|---|---|---|
| 3,097,194 | 7/1963 | Leonard et al. . |
| 3,290,276 | 12/1966 | Anderson . |
| 3,397,219 | 8/1968 | Ford et al. . |
| 3,642,728 | 2/1972 | Canter . |
| 4,102,876 | 7/1978 | Brenner et al. . |
| 4,255,540 | 3/1981 | Weiss . |
| 4,331,786 | 5/1982 | Foy et al. . |
| 4,387,174 | 6/1983 | Lundberg et al. . |
| 4,679,795 | 7/1987 | Melvin . |
| 4,801,649 | 1/1989 | Statz . |
| 4,840,982 | 6/1989 | Campbell et al. . |
| 4,858,924 | 8/1989 | Saito et al. . |
| 4,919,434 | 4/1990 | Saito . |
| 5,239,010 | 8/1993 | Balas et al. . |
| 5,244,969 | 9/1993 | Yamada . |
| 5,253,871 | 10/1993 | Viollaz . |
| 5,334,673 | 8/1994 | Wu . |
| 5,422,398 | 6/1995 | Weiss . |
| 5,484,870 | 1/1996 | Wu . |
| 5,556,098 | 9/1996 | Higuchi et al. . |
| 5,679,745 | 10/1997 | Hamada et al. . |
| 5,691,066 | 11/1997 | Rajagopalan . |
| 5,857,925 | * 1/1999 | Sullivan . |
| 5,919,100 | * 7/1999 | Boehm . |
| 5,962,140 | 10/1999 | Rajagopalan . |
| 6,001,930 | * 12/1999 | Rajagopalan . |

FOREIGN PATENT DOCUMENTS

| | | |
|---|---|---|
| 0 148 632 A2 | 7/1985 | (EP) . |
| 849058 | 9/1960 | (GB) . |
| 907765 | 10/1962 | (GB) . |
| 2 299 999 | 10/1996 | (GB) . |
| 8-103516 | 4/1996 | (JP) . |

OTHER PUBLICATIONS

Encyclopedia of Polymer Science and Engineering vol. 5 p. 416. 1987.*
R.A. Weiss et al., "Properties of Polyethylene Modified with Phosphonate Side Groups. I. Thermal and Mechanical Properties", J. Polymer Science: Polymer Physics, Ed., vol. 15, 1409–1425 (1977).
O. Olabisi, "Polyblends", Encyclopedia of Chemical Technology, 3$^{rd}$ Edition, vol. 18 474–478 (1982).
J.M. Willis et al., "Processing Morphology Relationships of Compatibilized Polyolefin/Polyamide Blends", J. Materials Science, vol. 26, 4742–4750 (1991).
X. Lu et al., "Specific Interactions and Ionic Aggregation in Miscible Blends of Nylon–6 and Zinc Sulfonated Polystyrene Ionomer", Macromolecules, vol. 25, 6185–6189 (1992).
Z. Gao et al., "Blends of Polyamide–6 and Sulfonated Polystyrene. A Solid–State NMR Study", Macromolecules, vol. 25, 6460–6465 (1992).
R.A. Weiss et al., "Phase Behaviour of Blends of Nylon 6 and Lightly Sulfonated Polystyrene Ionomers", Polymer, vol. 35, No. 9, 1963–1969 (1994).
P. Rajagopalan et al., "Molecular Interpretation of Miscibility in Polyamide–6 Blends with Alkali Ionomers of Sulfonated Polystyrene", J. Polymer Science Part B: Polymer Physics, vol. 33. 495–503 (1995).
R.A. Weiss et. al., "Morphology Control in Polyamide/Ionomer Blends", ANTEC '97, 2653–2657 (1997).

\* cited by examiner

*Primary Examiner*—David J. Buttner
(74) *Attorney, Agent, or Firm*—Pennie & Edmonds LLP

(57) ABSTRACT

The present invention relates to a golf ball, comprising a cover, a core and optional intermediate layers, wherein the various ball components are formed from compositions comprising a sulfonated and/or phosphonated ionomer. The sulfonated and/or phosphonated ionomer preferably comprises sulfonated thermoplastic elastomers, sulfonated thermoplastic polymers, sulfonated thermoset polymers and mixtures thereof. The compositions include a blend of about 1 wt. % to about 99 wt. % of at least one sulfonated and/or phosphonated ionomer and about 99 wt. % to about 1 wt. % of at least co-component polymer. The co-component polymer may be a conventional ionomer, a thermoplastic, a thermoplastic elastomer, a thermoset polymer or mixtures thereof.

78 Claims, No Drawings

US 6,245,862 B1

GOLF BALLS COMPRISING SULFONATED OR PHOSPHONATED IONOMERS

This is a continuation-in-part of application Ser. No. 08/815,659 filed Mar. 13, 1997 now U.S. Pat. No. 6,187,864 and a continuation-in-part of application Ser. No. 08/862,831 filed May 23, 1997 now U.S. Pat. No. 5,981,654.

TECHNICAL FIELD

The present invention is directed to compositions and methods for forming golf ball covers, cores and intermediate layers and a golf ball formed of said compositions having improved properties. The compositions of the invention comprise at least one ionomer formed from a sulfonated and/or phosphonated polymer.

BACKGROUND OF THE INVENTION

Three-piece, wound golf balls with balata (trans-polyisoprene) covers are typically preferred by professional and low handicap amateur golfers. These balls provide a combination of distance, high spin rate, and control that is not available with an ionomer cover or in one-piece and two-piece balls. However, balata cuts easily, and lacks the durability required by the average golfer.

Two-piece golf balls, which are typically used by the average amateur golfer, provide a combination of durability and maximum distance that is not available with balata covered balls. These balls comprise a core, formed of a solid sphere which typically comprises a polybutadiene based compound, encased in an ionomer cover formed of, e.g., SURLYN®. These ionomers are ionic copolymers of an olefin and an unsaturated carboxylic acid in which at least a portion of the carboxylic acid moieties have been neutralized with a metal ion; thus, these materials are referred to as carboxylated ionomers. These balls are extremely durable, have good shear resistance and are almost impossible to cut. However, the durability results from the hardness of the ionomer, which gives such balls a very hard "feel" when struck with a golf club that many golfers find unacceptable.

Golf ball manufacturers have attempted to produce golf ball covers that provide the spin rate of balata with the cut resistance of an ionomer by forming blends of carboxylated ionomers. However, none of the disclosed ionomer blends have resulted in the highly-desirable playability of a balata covered golf ball.

Several references disclose that sulfonated rubbers or elastomers may be used in golf ball covers. For example, Japanese patent publication JP 8-103516 A discloses a two layer golf ball with a cover formed only from the zinc ionomers of sulfonated non-polar rubbers, i.e., trans-polybutadiene, trans-polyisoprene or trans-polyoctenemer. These unsaturated rubbers are required to have at least 60% trans-1,4-configuration content and the added sulfonate moieties are said to be 100% neutralized with zinc in forming ionomers therefrom. However, this reference does not disclose or suggest that a polar rubber may be sulfonated and formed into an ionomer. Moreover, this reference does not disclose or suggest that a thermoplastic elastomer may be sulfonated and formed into an ionomer.

The JP reference neither discloses nor suggests that golf ball compositions comprising the ionomers described therein may be used in any layer of a golf ball other than the cover. Furthermore, this reference does not disclose or suggest that a sulfonated unsaturated rubber ionomer may be used in a blend with greater than 50 wt. % carboxylated ionomer in a golf ball composition. Additionally, this reference does not disclose or suggest that a sulfonated elastomer ionomer can be blended with a thermoplastic polymer such as a polyamide.

U.S. Pat. No. 5,679,745 to Hamada et al. discloses a two layer golf ball with a cover which comprises a mixture of a sulfonated ionomer and a carboxylated ionomer. This reference teaches that the sulfonated ionomer must have an elastomeric portion in the polymer chain; block copolymer elastomers comprising styrene and saturated hydrocarbon copolymer elastomers are said to be preferred. The Hamada et al. reference, however, does not disclose or suggest that a sulfonated elastomeric ionomer may be used without a carboxylated ionomer in a golf ball composition, nor does it suggest that a sulfonated elastomeric ionomer/carboxylated ionomer blend may be useful in any layer of a golf ball other than the cover. Additionally, this reference does not suggest that a sulfonated elastomeric ionomer can be blended with a polymer, such as a thermoplastic, which is not an ionomer; in particular, a sulfonated elastomeric ionomer blended with a polyamide is not disclosed.

Furthermore, neither of the above references discloses phosphonated ionomers or suggest that such materials could be present in golf ball compositions.

Other manufacturers have attempted to use nonionomer polymers, e.g., thermoplastics such as polyamide, in golf ball compositions to overcome the deficiencies in carboxylated ionomer blends. For example, U.S. Pat. No. 5,244,969 to Yamada discloses golf ball covers comprising a blend of two specific ethylene-acrylic acid copolymer ionomer resins and less than 20% by weight of a polyamide. Yamada does not claim or even disclose, however, a blend of a single carboxylated ionomer resin and a polyamide or the use of sulfonated and/or phosphonated ionomer blends with polyamide.

UK patent application GB 2299999 A discloses a three layer golf ball with a soft cover layer and a hard intermediate layer. The intermediate layer is said to contain at least 5% by weight of a high-rigidity polyamide resin, optionally blended with a carboxylated ionomer. Preferred polyamides are said to have a stiffness or bending modulus of 140 to 252 kpsi. The bending modulus of the intermediate layer composition is said to range from 56,000 to 112,000 psi, preferably 70,000 to 112,000 psi, while its Shore D hardness is said to range from 65 to 90. The cover layer of the three layer golf ball is said to comprise ionomer resin with a stiffness of 14,000 to 35,000 psi and Shore D hardness of 56 to 64.

The U.K. publication does not disclose sulfonated and/or phosphonated ionomers nor their blends with any polymer, such as a carboxylated ionomer or a non-ionomer polymer, including polyamides. It also does not disclose a blend of carboxylated ionomer/polyamide present in a cover layer, nor does it disclose a blend of carboxylated ionomer/polyamide present in an intermediate layer which is softer than the cover layer.

In all of the above references describing compositions comprising polyamide, none disclose or even suggest using blends of polyamide with sulfonated and/or phosphonated ionomers.

Several references disclose blends of sulfonated polystyrene ionomers and polyamide-6, e.g., see X. Lu and R. A. Weiss [Macromol., 25:6185–6189 (1992)]; Z. Gao et al. [Macromol., 25:6460–6465 (1992)]; R. A. Weiss and X. Lu [Polymer, 35(9):1963–1969 (1994)]; P. Rajagopalan et al. [J. Polym. Sci. Pt. B, Polym. Physics, 33:495–503 (1995)]. For example, P. Rajagopalan et al. disclose that blends of polyamide-6 and the lithium ionomer of 9.8 mol. % and 5.4 mol. % sulfonated polystyrene are miscible over a wide composition range. R. A. Weiss and X. Lu disclose that, in compatible sulfonated ionomer/polyamide blends, a complex forms between the metal sulfonate of a sulfonated polystyrene ionomer and the amide moiety of polyamide-6. Similar complexes are also thought to form between the lithium sulfonate of a sulfonated polystyrene ionomer and the amide moiety of poly(N,N'-dimethylethylene sebacamide) (a methylated polyamide); see R. A. Weiss et al. [ANTEC '97, 2653–2657 (1997)]. None of these references, however, disclose the use of such blends in golf balls. In addition, none of these references disclose a blend of a sulfonated ionomer formed from a non-styrenic polymer and a polyamide. Moreover, none of these references disclose an ionomer forned from a phosphonated polymer or a blend of a phosphonated ionomer with a non-ionomer polymer, e.g., a polyamide.

Several patents disclose blends of carboxylated ionomers and elastomers. For example, U.S. Pat. No. 4,858,924 to Saito discloses the use of a thermoplastic resin with a flexural modulus of 1,500 to 5,000 kg/cm$^2$ as the cover of a golf ball. Particularly, polyamide elastomer, urethane elastomer, styrene-butadiene copolymer elastomer and polyester elastomer are said to be preferred when used alone or blended with a matrix resin, that is, another like flexible thermoplastic resin. The polyester elastomers are said to include block copoly(ether-esters), block copoly(lactone-esters) and aliphatic and aromatic dicarboxylic acid copolymerized polyesters. However, this reference does not teach that the ionomer blended with the polyamide can be formed from a sulfonated and/or phosphonated polymer.

U.S. Pat. No. 4,919,434 to Saito discloses the use of a carboxylated ionomer blended with a polyamide elastomer for use as the inner or outer cover of a golf ball. Described only as elastomeric, the polyamide elastomer material is said to have a low flexural modulus and hardness. However, the exact chemical composition or structure of the polyamide elastomer is not disclosed. When blended with a carboxylated ionomer, the polyamide elastomer-ionomer blend outer cover layer is said to have a flexural modulus of 28,000–71,000 psi (2000–5000 kg/cm$^2$). However, Saito '434 is silent on the hardness characteristics of the blends and of their components. Moreover, Higuchi does not disclose blends of a polyamide elastomer with an ionomer formed from a sulfonated and/or phosphonated polymer.

Intermediate layers containing blends of carboxylated ionomers and elastomers are disclosed for multilayer golf balls. For example, U.S. Pat. No. 5,556,098 to Higuchi et al. discloses the use of a three-layer golf ball with a soft middle layer composed of a blend of a carboxylated ionomer and a polyamide elastomer, such that the JIS C hardness of the blend is less than 80. The exact chemical composition or structure of the polyamide elastomer is not disclosed other than that it is said to be a thermoplastic elastomer. However, Higuchi does not disclose blends of these elastomers with an ionomer formed from a sulfonated and/or phosphonated polymer.

U.S. Pat. No. 5,253,871 to Viollaz discloses the use of at least 10% of a block copoly(amide-ether) elastomer, optionally blended with a carboxylated ionomer, for use as the middle layer of a three-layer golf ball. The hardness of the block copolymer is said to be within the range of 30–40 Shore D hardness while the corresponding hardness of the ionomer component is said to be between 55–65 Shore D. The overall hardness of the middle layer is said to range from 20–50 Shore D. The cover may also be a block copoly(amide-ether) and ionomer blend but its overall hardness must be greater than that of the adjacent middle layer. However, Viollaz does not disclose blends of these block copolymers with an ionomer formed from a sulfonated and/or phosphonated polymer.

In all of the above references describing compositions comprising a polyamide elastomer, none disclose or even suggest, using blends of polyamide and sulfonated and/or phosphonated ionomers.

Carboxylated ionomers have been used in three component blends, as impact modifiers and/or as compatibilizers. For example, U.S. Pat. No. 4,840,982 to Campbell et al. discloses a blend containing a matrix (A) of an aromatic polymer (which may be polyamide, polyester, polycarbonate or polyimide but is preferably a polyphenylene ether or an aromatic polyester, polycarbonate or polyimide) in which is dispersed an impact modifier (B) consisting of a minor portion of a carboxylated or sulfonated elastomer (preferably an aliphatic hydrocarbon rubber) which is formed into an ionomer. A minor portion of a dispersion stabilizer (C) must also be present. (C) must be an aromatic polymer ionomer and, preferably, is an ionomer derivative of (A). This reference does not disclose the use of such blends in golf balls. Moreover, a blend comprising a phosphonated ionomer is not disclosed. Furthermore, a blend of a sulfonated ionomer and a non-aromatic polyamide is not disclosed. In addition, a blend consisting essentially of a sulfonated ionomer and a polyamide is not disclosed.

Compatibilizers consisting of carboxylated ionomers have been used to provide or enhance the compatible nature of blends of two non-ionomer polymers which are normally incompatible; see J. M. Willis et al. [J. Materials Sci., 26:4742 (1991)]; U.S. Pat. No. 4,801,649; EP 148,632 A2; and O. Olabisi [Encyclopedia of Chemical Technology, 3rd Edition, 18:474 (1982)]. A recent reference, U.S. Pat. No. 5,422,398 to Weiss, describes the use of a sulfonated polystyrene ionomer as a compatibilizer. Incorporation of this material into two incompatible heteroatom polymers, i.e., polymers comprising amide, ester, ether, sulfone or amine moieties, may result in a miscible blend. However, this reference does not disclose blends comprising a phosphonated ionomer, blends of a phosphonated ionomer and a non-ionomer polymer or blends consisting essentially of a sulfonated ionomer and a non-ionomer polymer. Moreover, the three component blends of this reference are not disclosed as being useful in golf balls.

U.S. Pat. No. 4,679,795 to Melvin et al. discloses blends of optical brighteners with the following golf ball cover materials: polyolefins and their copolymers; polyurethanes; polyamides; polyamide blends with SURLYN®, polyethylene, ethylene copolymers and EPDM; acrylic resins; thermoplastic rubbers such as urethanes, styrene block copolymers, copoly(ether-amides) and olefinic thermoplastic rubbers; thermoplastic polyesters and polyester thermoplastic elastomers; and blends of thermoplastic rubbers with nylon. The reference contains no teaching or suggestion, however, to form a polyamide-sulfonated and/or phosphonated ionomer blend.

None of the blended compositions described above offers the combination of durability and distance provided by golf balls with ionomer covers and the high spin rate and control that is available with three-piece, wound golf balls having balata covers. Therefore, there remains a need for one-piece, two-piece, three-piece wound golf balls (with solid or liquid centers) and/or multilayer golf balls having cores, intermediate layers and/or covers comprised of an ionomer formed from a sulfonated and/or phosphonated polymer, with the durability and distance of a SURLYN® covered ball and the feel, click, and control of a balata covered three-piece ball.

SUMMARY OF THE INVENTION

One embodiment of the present invention relates to a golf ball comprising a cover, a core layer and at least one intermediate layer interposed between the cover and the core layer, where at least one of the layers is formed of a composition which comprises at least one ionomer formed from a polymer having moieties selected from the group consisting of sulfonate, phosphonate and mixtures thereof. These ionomers may be a reaction product of a metal base and the sulfonated and/or phosphonated polymer. The metal base may contain at least one metallic cation, which may be Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, or mixtures thereof.

About 1 mol % to about 90 mol % of the sulfonate and/or phosphonate moieties of the ionomer may be present in an ionic form. Preferably, at least about 10 mol % of the sulfonate and/or phosphonate moieties of the ionomer are present in an ionic form.

The sulfonated and/or phosphonated polymer may be a sulfonated polymer which contains from about 0.1 mol % to about 30 mol % sulfonate moieties. The sulfonated polymer may be at least one sulfonated thermoplastic elastomer, a least one sulfonated thermoplastic polymer, a least one sulfonated thermoset polymer, or mixtures thereof.

Preferably, the sulfonated thermoplastic elastomer has a flexural modulus of from about 1,000 psi to about 150,000 psi and comprises a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, or mixtures thereof.

Preferably, the sulfonated thermoplastic polymer has a flexural modulus of from about 3,000 psi to about 500,000 psi and comprises an olefinic polymer, a polyamide, a polyester, a polymer comprising styrene, a poly(alkyl) alkylacrylate, a polycarbonate, a polyphenylene oxide, a polyether ketone, a polysulfone, a poly(phenylene sulfide), a poly(ether imide), a reinforced engineering plastics comprising an aromatic moiety, or mixtures thereof.

Preferably, the sulfonated thermoset polymer has a, flexural modulus of from about 1,000 psi to about 150,000 psi and comprises poly(isoprene), poly(butadiene), poly (octenemer), styrene-butadiene rubber, ethylene-propylene-diene terpolymer rubber, ethylene-propylene copolymer rubber, nitrile rubber, butyl rubber, poly(chloroprene), poly (urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin, or mixtures thereof.

If desired, the composition of the invention may be substantially optical brightener-free.

The composition may comprise a blend of from about 1 wt. % to about 99 wt. % of at least one ionomer formed from a sulfonated and/or phosphonated polymer and from about 99 wt. % to about 1 wt. % of at least one co-component polymer. The co-component polymer may be at least one conventional ionomer, non-ionomer thermoplastic elastomer, non-ionomer thermoplastic polymer, non-ionomer thermoset polymer, or mixtures thereof.

The co-component non-ionomer thermoplastic elastomer may be a block copoly(ester-ester), a block copoly(ester-ether), a block copoly(amide-ester), a block copoly(amide-ether), a block copoly(urethane-ester), a block copoly (urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, or mixtures thereof.

The co-component non-ionomer thermoplastic polymer may comprise at least one olefinic polymer. The co-component non-ionomer thermoplastic polymer may be at least one poly(amide), poly(ethylene terephthalate), poly (butylene terephthalate), poly(trimethylene terephthalate), poly(ethylene naphthalate), poly(vinyl alcohol), poly(vinyl acetate), poly(silane), poly(vinylidene fluoride), acrylonitrile-butadiene-styrene copolymer, their copolymers, or mixtures thereof.

Preferably, when the non-ionomer thermoplastic polymer is a polyamide polymer, the polyamide polymer has a flexural modulus of from about 3,000 psi to about 500,000 psi and is selected from polyamide homopolymers, polyamide copolymers, or mixtures thereof. The polyamide homopolymer may be polyamide 6, polyamide 11, polyamide 12, polyamide 4,6, polyamide 6,6, polyamide 6,9, polyamide 6,10, polyamide 6,12, or mixtures thereof. The polyamide copolymer may be polyamide 6/6,6, polyamide 6,6/6,10, polyamide 6/6, T, polyamide 6/6,6/6,10, or mixtures thereof.

The co-component conventional ionomer may comprise a copolymer of a mono-olefin with from about 1 wt. % to about 50% of at least one comonomer selected from unsaturated mono- or di-carboxylic acids having 3 to 12 carbon atoms and esters thereof, where from about 10% to about 90% of the carboxylic acid moieties are neutralized by a cation. The cation may be Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, or mixtures thereof.

The conventional ionomer may be a copolymer of ethylene, a softening comonomer present in an amount of from 0 wt. % to about 50 wt. % of the polymer and selected from alkyl acrylate, alkyl methacrylate and mixtures thereof, and an acid present in an amount from about 5 wt. % to about 35 wt. % of the polymer and selected from acrylic acid, methacrylic acid and mixtures thereof, where the acid moiety is neutralized from about 1% to about 90% by at least one the cation. Preferably, the conventional ionomer is a copolymer of ethylene and from about 17 wt. % to about 20 wt. % of methacrylic acid, where from about 35% to about 65% of the carboxylic acid moieties are neutralized by Li, Na, Mg, Zn, K, Ti, Zr, Pt or a mixture thereof.

The co-component non-ionomer thermoset polymer may be at least one of poly(isoprene), natural or synthetic, poly(butadiene), poly(octenemer), styrene-butadiene rubber, ethylene-propylene-diene terpolymer rubber, ethylene-propylene copolymer rubber, nitrile rubber, butyl rubber, poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin, or mixtures thereof.

In another embodiment, the invention relates to a golf ball comprising a cover and a core, where the cover is formed of a composition which comprises at least one ionomer formed from a polymer having moieties selected from sulfonate, phosphonate and mixtures thereof, with the proviso that the polymer is not a nonpolar sulfonated thermoplastic elastomer or a nonpolar thermoset polymer when only one the sulfonated and/or phosphonated polymer is present.

This composition may comprise a blend of from about 1 wt. % to about 99 wt. % of at least one ionomer formed from a sulfonated and/or phosphonated polymer and from about 99 wt. % to about 1 wt. % of at least one co-component polymer. The co-component polymer may be at least one conventional ionomer, non-ionomer thermoplastic elastomer, non-ionomer thermoplastic polymer, non-ionomer polar thermoset polymer, or mixtures thereof. The non-ionomer polar thermoset polymer may be poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin, or mixtures thereof.

An additional embodiment of the present invention is a golf ball comprising a cover and a core, where the cover is formed of a composition comprising a polymeric component. The polymeric component consists essentially of at least one sulfonated ionomer formed from a sulfonated polar thermoplastic elastomer. The ionomer may be a reaction product of a metal base and the sulfonated polar thermoplastic elastomer.

Preferably, the sulfonated polar thermoplastic elastomer has a flexural modulus of from about 1,000 psi to about 150,000 psi and comprises a block copoly(ester-ester), a block copoly(ester-ether), a block copoly(amide-ester), a block copoly(amide-ether), a block copoly(urethane-aster), a block copoly(urethane-ether), a block polystyrene thermoplastic elastomer comprising a functionalized substantially saturated rubber, a thermoplastic and elastomer blend wherein the elastomer is not vulcanized and the thermoplastic comprises polyvinylchloride, a halogenated polyolefin comprising propylene and mixtures thereof, a melt-bondable thermoplastic and elastomer blend wherein the rubber is dynamically vulcanized, or mixtures thereof.

The invention also relates to a golf ball comprising a cover and a core, where the cover is formed of a composition comprising polymeric components. The polymeric components consist essentially of a blend of from about 1 wt. % to about 99 wt. % of at least one ionomer formed from a sulfonated polar thermoplastic elastomer and from about 99 wt. % to about 1 wt. % of at least one co-component polymer. The co-component polymer may be at least one conventional ionomer, non-ionomer thermoplastic elastomer, non-ionomer thermoplastic polymer, non-ionomer polar thermoset polymer, or mixtures thereof.

DETAILED DESCRIPTION OF THE INVENTION

The present invention relates to golf ball forming compositions having unexpectedly improved durability, initial velocity and shear resistance. The compositions of the invention comprise at least one ionomer formed from a sulfonated and/or phosphonated polymer or resin. The ionomer may be formed from a sulfonated and/or phosphonated thermoplastic polymer, a sulfonated and/or phosphonated thermoplastic elastomer, a sulfonated and/or phosphonated thermoset polymer or mixtures thereof.

Additional embodiments of the invention comprise, various blends of at least one of the ionomers formed from a sulfonated and/or phosphonated polymer as described above, combined with at least one other co-component polymer, which may be, for example, a conventional ionomer or a polyamide (also known as PA) present in the form of a homopolymer, a copolymer or mixtures thereof.

The invention provides great flexibility for selecting the modulus and hardness of each sulfonated and/or phosphonated ionomer and, optionally, of their blendg over a wider range than is possible with conventional ionomers or with blends composed solely of conventional ionomers.

As used in discussing the present invention, a "conventional ionomer" is a polymer which comprises, as acidic moieties, carboxylic-acid moieties, or basic moieties, such as quaternary nitrogen. The acidic or basic moieties are at least partially neutralized with a conjugate base or acid, respectively. Negatively charged carboxyl moieties may be neutralized with a cation, such as a metal ion or a quaternary phosphonium or ammonium cation. Positively charged basic moieties, such as quaternary nitrogen, may be neutralized with an anion, such as a halide, an organic acid, or an organic halide. Acidic or basic moieties may be incorporated into an ionomer through copolymerization of an acidic or basic monomer, such as alkyl (meth)acrylate, with at least one other comonomer, such as an olefin, styrene or vinyl acetate, followed by at least partial neutralization to form an ionomer. Alternatively, acidic or basic moieties may be incorporated into a polymer to form a conventional ionomer by reacting the polymer, such as polystyrene or a polystyrene copolymer including a block copolymer of polystyrene, with a functionalizing reagent, such as a carboxylic acid or an amine, followed by at least partial neutralization.

The present invention is directed to methods and compositions for use in the manufacture of golf balls, particularly, golf ball cores, covers and intermediate layers. As used herein, an "intermediate layer" is an independent layer between a cover and a core. Such an intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of curing or crosslinking when compared to the corresponding attribute of the component comprising the adjacent cover or core layer. Optionally, an intermediate layer may be a wound layer, i.e., comprise the windings of a wound golf ball, as known to those skilled in the golf ball art. An example of a wound layer is the elastomeric windings which wrap a liquid or solid center. Moreover, a "cover" or a "core" as these terms are used herein may comprise a single layer or a plurality of layers. An intermediate layer may be used, if desired, with a dual or a multilayer cover or a dual or a multilayer core, or with both a multilayer cover and a multilayer core.

Therefore, an intermediate layer is also sometimes referred to in the art as an inner cover layer, as an outer core layer or as a mantle layer.

As used herein, "sulfonated and/or phosphonated polymers" is defined as polymers and copolymers comprising sulfonate moieties or derivatives thereof, polymers and copolymers comprising phosphonate moieties or derivatives thereof, polymers and copolymers comprising sulfonate and phosphonate moieties or derivatives thereof, and mixtures of these polymers and copolymers. Sulfonated and/or phosphonated polymers include sulfonated and/or phosphonated thermoplastic polymers, sulfonated and/or phosphonated thermoplastic copolymers, sulfonated and/or phosphonated thermoplastic elastomers, sulfonated and/or phosphonated thermoset polymers, sulfonated and/or phosphonated thermoset copolymers and mixtures of these materials.

As used herein, a "copolymer" is defined as a polymer comprising at least two different monomeric units. Thus, a polymeric chain made up of three different monomers (also known as a terpolymer) is included within the term "copolymer," as are polymer chains containing more than three different monomeric units. Copolymers may be formed in a variety of ways known to those of ordinary skill in the art, for example, by polymerizing two or more different monomers, by graft copolymerization or block copolymerization, wherein an existing polymer chain is further reacted with a different monomer, and by a post-polymerization reaction, e.g., partial hydrolysis of the ester side-groups of a polymer.

As used herein, a thermoplastic polymer is exclusive of a thermoplastic elastomer polymer (TPE) in that, as one of ordinary skill in the art would recognize, a TPE exhibits the typical mechanical response, not of a thermoplastic, but of an elastomer. For example, a thermoplastic elastomer polymer should stretch rapidly and considerably under tension, reach high elongatiaong with low damping, i.e., little loss of energy as heat, and should retract rapidly from high elongations, exhibiting the phenomenon of snap or rebound.

As used herein, a thermoset polymer is exclusive of a TPE in that, as one of ordinary skill in the art would recognize, a TPE exhibits the typical ability of a thermoplastic to liquify and flow when subjected to suitably high shear stresses at suitably high temperatures while a thermoset, comprising crosslinks, does not. Moreover, uncrosslinked thermoset polymers include chemical groups capable of forming crosslinks while such groups are not required to be present in TPES.

As used in discussing the present invention, "ionomers formed from sulfonated and/or phosphonated polymers" are defined as sulfonated polymers, phosphonated polymers and sulfonated and/or phosphonated polymers which comprise at least one sulfonic acid and/or phosphonic acid moiety neutralized with a conjugate base, typically a cation such as a metal ion or a quaternary phosphonium or ammonium cation. As used herein, the term "sulfonated and/or phosphonated ionomer" is synonymous with the term "ionomer formed from a sulfonated and/or phosphonated polymer".

When the compositions of the invention have no added compatibilizing component, this condition is defined and referred to herein as being "substantially compatibilizer-free." Moreover, when the compositions of the invention have no added optical brightener component, this condition is defined and referred to herein as being "substantially optical brightener-free."

The sulfonated and/or phosphonated ionomers of the invention and compositions comprising them can be used in the formation of golf ball covers and as intermediate layers for multi-layer golf balls. Such intermediate layers, of course, may be wound layers. Further, the sulfonated and/or phosphonated ionomers of the invention and their compositions can be used to form covers for two-piece golf balls. They can also be used to form unitary or one-piece golf balls. Additionally, they can be used to form golf ball cores for two piece or multi-layer balls.

In the present invention, at least one ionomer formed from a sulfonated and/or phosphonated polymer is present. In particular, the sulfonated and/or phosphonated ionomer may be any ionomer formed from a sulfonated and/or phosphonated TPE polymer, a sulfonated and/or phosphonated thermoplastic polymer, or a sulfonated and/or phosphonated thermoset polymer that is or can be used in golf ball covers.

The term "sulfonated polymer" when used with reference to this invention is intended to include both the sulfonated polymers produced by copolymerization with a sulfonated monomer and polymers and copolymers sulfonated by using a sulfonation agent in a post-polymerization reaction. The term "phosphonated polymer" when used with reference to this invention is intended to include both the phosphonated polymers produced by copolymerization with a phosphonated monomer and polymers and copolymers phosphonated by using a phosphonation agent in a post-polymerization reaction. The term "sulfonated and/or phosphonated polymer" when used with reference to this invention is intended to include the polymers and copolymers produced by: copolymerization with a sulfonated monomer, copolymerization with a phosphonated monomer, copolymerization with a sulfonated monomer and with a phosphonated monomer, sulfonating using a sulfonation agent in a post-polymerization reaction, phosphonating using a phosphonation agent in a post-polymerization reaction, and sulfonating and phosphonating using a sulfonation agent and a phosphonation agent in at least one post-polymerization reaction.

If desired, the sulfonated and/or phosphonated polymer may be prepared by copolymerizing a sulfonated and/or phosphonated monomer with at least one other comonomer. For example, U.S. Pat. Nos. 4,102,876 and 4,387,174 disclose the formation of sulfonated copolymers, terpolymers and the like by free radical copolymerization of a vinyl monomer comprising a sulfonate substituent with at least one non-sulfonated vinyl comonomer.

When the sulfonated and/or phosphonated monomer further comprises a vinyl moiety, such as is suitable for copolymerization using polymerization initiators or catalysts, e.g., free radical, redox, Ziagler-Natta, metallocene, single-site, anionic and cationic initiators, the monomer is characterized by one of the following formulas:

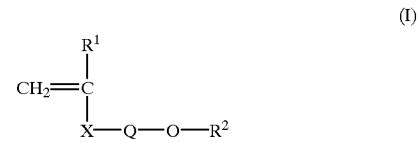

(I)

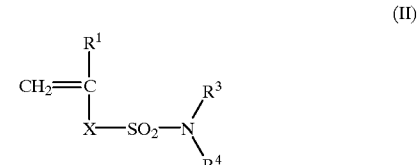

(II)

-continued

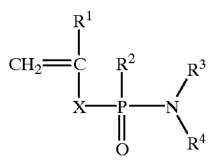
(III)

wherein $R^2$ is hydrogen, $—OR^5$ or $—NR^3R^4$; $R^1$, $R^3$, $R^4$ and $R^5$ are, independently, hydrogen or an alkyl group ranging from methyl to decyl inclusive and may be linear or branched; X is aromatic or $(CH_2)_n$ where n is 0, i.e., a direct bond, 1, 2, 3 or 4;

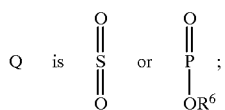

and $R_6$ is $R_5$ or $—NR^3R^4$.

Preferably, when the sulfonated monomer further comprises a vinyl group, it has one of the following structures:

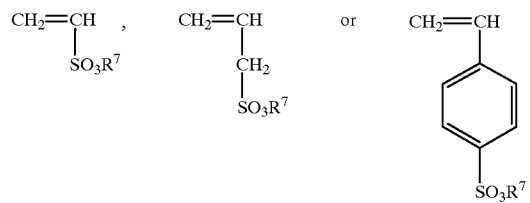

wherein each $R^7$ is, independently, hydrogen or an alkyl group ranging from methyl to decyl inclusive and may be linear or branched. Preferably, each $R^7$ is, independently, an alkyl group ranging from methyl to butyl inclusive and may be linear or branched. More preferably, each $R^7$ is methyl.

Also preferably, when the phosphonated monomer further comprises a vinyl group, the structure is:

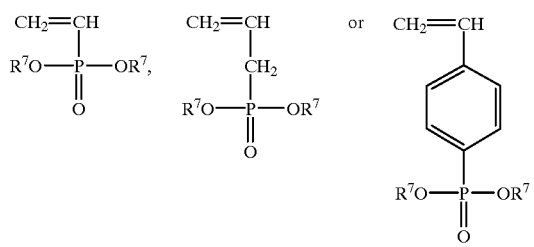

wherein each $R^7$ is, independently, hydrogen or an alkyl group ranging from methyl to decyl inclusive and may be linear or branched. Preferably, each $R^7$ is, independently, an alkyl group ranging from methyl to butyl inclusive and may be linear or branched. More preferably, each $R^7$ is methyl.

A vinyl vomonomer, which is not sulfonated and/or phosphonated, is used to form a copolymer with at least one sulfonated and/or phosphonated vinyl monomer. The vinyl comonomer may be any material comprising at least one vinyl group and be able to be polymerized by polymerization initiators or catalysts, e.g., free radical, redox, Ziegler-Natta, metallocene, anionic and cationic initiators, as known to those skilled in the polymer art. Preferably, the vinyl comonomer is an olefin with attached linear or branched alkyl groups having from about 1 to about 18 carbon atoms which includes but is not limited to the following materials: an α-olefin monomer containing from 2 to 10 carbon atoms, e.g., ethylene, propylene, butene, hexene, octene and diene monomers, e.g., butadiene and isoprene; an alkyl acrylate or an alkyl alkylacrylate monomer, wherein each alkyl group ranges, independently, from methyl to decyl inclusive and may be linear or branched; a glycidyl acrylate or a glycidyl alkylacrylate monomer, wherein the alkyl group ranges from methyl to decyl inclusive and may be linear or branched; a vinyloxazoline or 1-alkyl vinyloxazoline monomer, wherein the alkyl group ranges from methyl to decyl inclusive and may be linear or branched; and maleic anhydride. The vinyl comonomer may also be a material which copolymerizes with a sulfonated vinyl monomer, carbon monoxide and sulfur dioxide.

Upon initiation by polymerization initiators and under conditions known to those skilled in the polymerization art, copolymers and the like are formed by polymerizing at least one sulfonated or phosphonated monomer with at least one other comonomer which is non-sulfonated and non-phosphonated.

The sulfonated and/or phosphonated monomers suitable for condensation copolymerization are characterized by one of the following formulas (IV) through (VII):

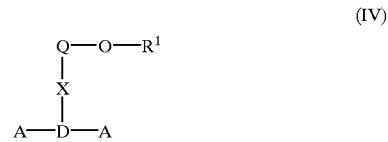
(IV)

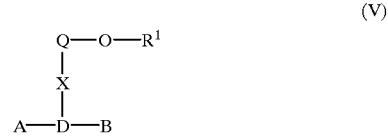
(V)

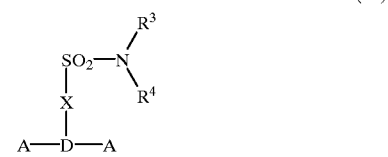
(VI)

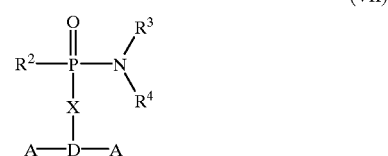
(VII)

wherein $R^1$, $R^2$, $R^3$, $R^4$, $R^5$, $R^6$, X and Q are as defined above; A and B comprise functional groups reactive through condensation polymerization; and D comprises a functional group, not reactive through condensation polymerization, to which the reactive functional groups and the sulfonate and/or phosphonate functionality are attached. The types of groups; which may comprise A, B and D are well-known in the polymer art. For example, a copolyamide condensation, which will be described later in more detail, can be modified to yield a partially sulfonated polymer as follows. A sulfonated diamine monomer, obtained from formula (IV) when A is $NH_2$, D is $(CH_2—C_4H_7—CH_2)$, X is $(CH_2)_0$ and Q is $SO_2$, may be copolymerized with 1,6-diaminohexane and adipic acid to yield a partially sulfonated polyamide 6,6 copolymer. Alternatively, a sulfonated amino acid, obtained from formula (V) when A is $NH_2$, B is COOH, D is ($CH_2$—$C_3H_5$—$CH_2$), X is $(CH_2)_0$, i.e., a direct bond, and Q is $SO_2$, may be copolymerized with 6-aminohexanoic acid to yield a partially sulfonated polyamide 6 copolymer.

A sulfonated and/or phosphonated monomer suitable for ring-opening copolymerization is characterized by one of the following formulas (VIII) through (X):

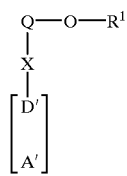

(VIII)

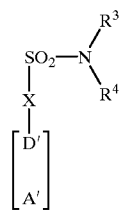

(IX)

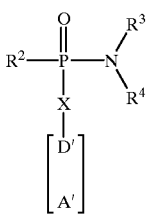

(X)

wherein $R^1$, $R^2$, $R^3$, $R^4$, $R^5$, $R^6$, X and Q are as defined above; A' comprises a functional group reactive through ring-opening polymerization; and D' comprises a cyclic functional group not reactive through ring-opening polymerization (the ring further comprising the reactive functional group A') to which the sulfonate and/or phosphonate functionality is attached. The types of groups which may comprise A' and D' are well-known in the polymer art. For example, a ring-opening copolyamide copolymerization, described in more detail below, can be modified so that it yields a partially sulfonated polyamide copolymer as follows. A sulfonated cyclic monomer, obtained from formula (VIII) when A' is —NH—CO—, D' is —($CH_2$—$C_3H_5$—$CH_2$)—, X is $(CH_2)_0$ and Q is $SO_2$, may be copolymerized with ε-caprolactam to yield a partially sulfonated polyamide 6 copolymer.

As would be readily apparent to those skilled in the art, protecting groups may be required under certain polymerization conditions. For example, if the sulfonated monomer is present in the form of a sulfonic acid and/or the phosphonated monomer is present in the form of a phosphonic acid, then protecting groups may be required to minimize reaction of the acid during copolymarization. Morrison and Boyd discuss the protection of such groups, which may later be removed to reform the acid after condensation copolymerization is complete. (See: R. T. Morrison and R. N. Boyd, "Organic Chemistry", 4th Ed., Allyn and Bacon, Boston, 1983).

The above examples demonstrate the formation of partially sulfonated polyamides by condensation polymerization and by ring-opening polymerization. However, as those skilled in the copolymerization art will recognize, these techniques may be readily adapted to the formation of a variety of copolymers which are partially sulfonated and/or phosphonated. For example, partially sulfonated and/or phosphonated condensation copolymers may be formed; these include, but are not limited to, the following types of copolymers: polyesters, polyanhydrides, polyacetals, polyurethanes, polyureas, cellulosics, phenol-aldehyde copolymers, urea-aldehyde copolymers, polysulfides and polyciloxanes. Also, partially sulfonated and/or phosphonated ring-opening copolymers may be formed; these include, but are not limited to, the following types of copolymers: polycarbonates, polyethers, polyesters, polyanhydrides, poly-N-carboxy-α-amino acid anhydrides, polyacetals, polysiloxanes, polyamines, polysulfides, polyphosphazenes and polysilazanes.

Random, block or alternating partially sulfonated and/or phosphonated copolymers may be formed by methods known in the copolymerization art. Random and block copolymers are preferred.

Alternatively, the sulfonated and/or phosphonated polymer may be prepared by sulfonating and/or phosphonating a substrate comprising a polymer, copolymer, and the like with a sulfonation and/or a phosphonation agent. Typically, a group comprising a sulfate and/or phosphonate or derivative thereof is reacted with the substrate or grafted onto the substrate. Preferably, the substrate has an aromatic group, vinyl unsaturation or both of these characteristics. More preferably, the substrate comprises an aromatic group. The aromatic group can be present in the main polymer chain of a polymeric substrate, in a side-group attached to the main polymer chain of a polymeric substrate, or both.

For example, as shown in Equation (1), a substrate comprising an aromatic group can be reacted with a sulfonation agent, e.g., sulfuric acid, or a phosphonation agent, e.g., phosphoric acid, to give a sulfonated or phosphonated substrate (XI), respectively, in the form of a sulfonic acid or a phosphonic acid.

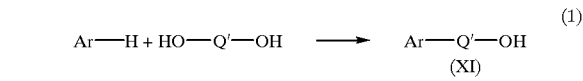

(1)

wherein Ar is an aromatic group and comprises a portion of a polymer main chain, a pendant group attached to the main chain, or a portion of a pendant group and

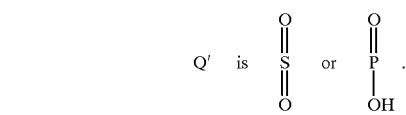

A substrate comprising a sulfonate or phosphonate ester (XII) may be formed from (XI) as shown in Equation (2):

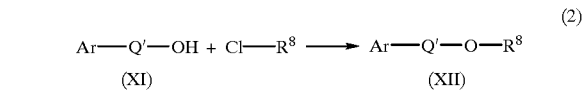

(2)

wherein Q' is as defined above and $R_8$ is an alkyl group ranging from methyl to decyl inclusive and may be linear or branched. Alternatively, the chemical structure of the full phosphonate ester formed from reacting material (XI) with two equivalents of $R_8Cl$ is as follows:

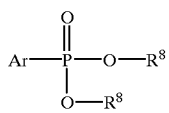

(XIII)

wherein $R^8$ is as defined above. A substrate comprising a sulfonamide or a phosphonamide (XV) may be formed from (XI) and an amine (XIV) as shown in Equation (3):

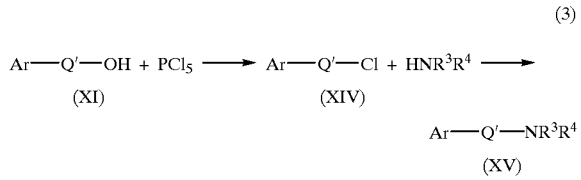

(3)

wherein Q' is as defined above and each $R^3$ and $R^4$ is selected, independently, from hydrogen and an alkyl group ranging from methyl to decyl inclusive and may be linear or branched.

Sulfonation agents, e.g., $SO_3$, $SO_3$ complexes of Lewis bases, sulfonic acid, sulfuric acid, $SO_2$ with oxygen and a free radical initiator, and acyl sulfate, are well known. General techniques for sulfonation are disclosed in U.S. Pat. Nos. 2,832,696, 2,937,066, 3,592,724, 3,613,957, 3,625,751, 3,642,728, 3,629,025, 3,770,706, 3,847,854, 31655, 511, 31870,841, 3,877,530, 3,959,561, 4,102,876, 4,220, 739, 4,615,914, and 4,915,912.

Phosphonation agents, e.g., $PCl_3$ and an $AlCl_3$ catalyst, $PCl_3$/oxygen mixtures, dimethyl phosphite and phosphoric acid, are well known. General techniques for phosphonation are described in U.S. Pat. Nos. 3,097,194, 3,290,276 and 4,255,540 and in British Patent Nos. 849,058 and 907,765.

It is also possible to prepare a sulfonated and/or phosphonated polymer by a process which is a hybrid of the copolymerization process and the process for sulfonating and/or phosphonating a substrate as described above. In the hybrid process, polymerization and sulfonation and/or phosphonation occur simultaneously. For example, as described in U.S. Pat. Nos. 3,097,194 and 3,397,219, at least one olefin monomer, $PCl_3$, a catalyst such as $AlCl_3$ or $TiCl_3$, and, optionally, oxygen are reacted to yield a phosphonated copolyolefin.

The sulfonated and/or phogphonated polymer contains from about 0.1 mol % to about 30 mol % of combined sulfonate and phosphonate groups. As used herein, "combined sulfonate and phosphonate groups" includes sulfonic acid, sulfonate ester, sulfonamide, phosphonic acid, phosphonate ester, phosphonamide, and all other sulfonate and phosphonate derivatives which may be present as any or all combinations thereof. As used herein, "mole percent combined sulfonate and phosphonate groups" is the total number of sulfonate and phosphonate groups present per 100 monomer units. Preferably, the sulfonated and/or phosphonated polymer contains from about 0.5 mol % to about 25 mol % combined sulfonate and phosphonate groups. More preferably, the sulfonated and/or phosphonated polymer contains from about 1 mol % to about 20 mol % of combined sulfonate and phosphonate groups.

Suitable substrates for sulfonation and/or phosphonation post-polymerization reactions include polymers such as TPEs, thermoplastic polymers and thermoset polymers. Each of these groups of materials is discussed in detail below.

TPEs possess the material and mechanical properties characteristic of an elagtomer but, unlike an elastomer, can be processed like a thermoplastic because they exhibit a melting point, which is a characteristic of a thermoplastic. Therefore, a TPE may substitute for an elastomer in imparting desirable rubber properties to a polymer blend while simultaneously maintaining many of the desirable advantages of a thermoplastic during processing, such as low cost fabrication, recyclability of scrap, and rapid, continuous, automated processing.

Generally, TPEs consist of at least two polymer types or phases, each of which has a characteristic softening temperature. One phase is selected to be above its softening point at the use temperature, thereby providing rubbery response, while the other phase is selected to be below its softening point at the use temperature, thereby anchoring the soft material in a manner analogous to the crosslink points of a conventional crosslinked rubber. However, unlike crosslinked rubber, the anchoring effect is reversible and can be removed by heating the TPE to an elevated temperature above both softening points. At the elevated temperature, conventional thermoplastic processing methods are possible. Subsequent cooling to below the upper softening point allows the anchoring effect to be reestablished.

The two polymer types or phases are often chemically joined or bonded to give a block copolymer molecular architecture, but this is not a requirement for exhibiting the typical TPE behavior described above. Mechanical mixing of two polymer types or in-situ polymerization or grafting may also result in TPE-like response. A list of 19 discrete chemical types of TPEs is available in Table 2 of the "Kirk-Othmer Encyclopedia of Chemistry and Technology", 4th Ed., Vol. 9, p. 18 (1994).

The TPE substrates of this invention can be characterized, by chemical composition, into polar TPEs and nonpolar TPEs. As used herein, a "nonpolar TPE" comprises substantially no atom other than carbon and hydrogen. Nonpolar TPEs are generally formed from nonpolar monomers, e.g., monomers comprising substantially no atoms other than carbon and hydrogen. As known to those of ordinary skill in the polymer art, even nonpolar TPEs may contain some non-carbon and non-hydrogen atoms. For example, it is common for initiator fragments, such as those derived from peroxides or azobisisobutyronitrile, or oxygenated by-products formed by oxidation, which may occur during melt processing of TPEs, to be present even in a nonpolar TPE. As used herein, a "polar TPE" comprises atoms other than carbon and hydrogen. Polar TPEs are commonly formed from at least one polar monomer, e.g., a monomer comprising a heteroatom.

The preferred TPEs of this invention can be further characterized by chemical composition to comprise the following categories: (1) block copoly(ester) copolymers (2) block copoly(amide) copolymers (3) block copoly(urethane) copolymers, (4) styrene-based block copolymers, (5) thermoplastic and elastomer blends wherein the elastomer is not vulcanized (hereafter "TEB") and (6) thermoplastic and elastomer or rubber blends wherein the elastomer is dynamically vulcanized (hereafter "TEDV"). Generally, the TPEs of categories (1), (2) and (3), containing heteroatgms, are polar TPES. The TPEs of categories (4), (5) and (6) may be polar or nonpolar TPEs, as will be discussed in detail below for each of these categories.

Block copoly(ester) copolymer TPEs (category (1)) comprise alternating blocks of a polyester oligomer, for example polyalkylene terephthalate (material with the higher softening point), wherein the alkylene group is typically 1,4- butylene, and another block with a lower softening point. Optionally, the block copoly(ester) copolymer can be partially comprised of at least one thioester. Still further, the block copoly(ester) copolymer TPE can optionally be a block copoly(thioester) copolymer.

If the lower softening point material of the block copoly (ester) copolymer is an ester, for example, a polylactone such as polycaprolactone, then block copoly(ester-esters) result. If the lower softening point material is a polyether oligomer, for example, a polyalkylene ether, then block copoly(ester-ethers) result. If the lower softening point material is a polythioether oligomer, for example, a polythioalkylene ether, then block copoly(ester-thioethers) result. If the lower softening point material is an α,ω-hydroxybutadiene oligomer such as the POLYBD® resins available from Elf Atochem S. A., optionally at least partially hydrogenated, then block copoly(ester-α,ω-hydroxybutadienes) result. optionally, the lower softening point material may comprise a mixture, for example, a mixture of any of the above-mentioned lower softening point materials, e.g., polyalkylene ethers such as propylene ether and butylene ether, or a mixture of a polyalkylene ether and a polythioalhylene ether. Furthermore, such mixtures of lower softening point materials may be present in a random or block arrangement, or as mixtures thereof.

Preferably, the block copoly(ester) copolymer TPE is a block copoly(ester-ester), a block copoly(ester-ether), or mixture thereof. More preferably, the block copoly(ester) copolymer TPE is at least one block copoly(ester-ether) or mixtures thereof. Suitable commercially available TPE copoly(ester-ethers) include the HYTREL® series from DuPont, which includes HYTREL® 3078, G3548W, 4056, G4078W and 6356; the LOMOD® series from General Electric, which includes LOMOD® ST3090A and TE3055A; ARNITEL® and URAFIL® from Akzo; ECDEL® from Eastman Kodak; and RITEFLEX® from Hoechst Celanese.

Block copoly(amide) copolymer TPEs (category (2)) comprise alternating blocks of a polyamide oligomer (material with the higher softening point) and another block with a lower softening point. Block copoly(amides) are described more fully in U.S. Pat. No. 4,331,786 to Foy et al. Optionally, the block copoly(amide) copolymer can be partially comprised of at least one thioamide. The block copoly (amide) copolymer TPE can optionally be a block copoly (thioamide) copolymer.

If the lower softening point material of the block copoly (amide) copolymer is, e.g., a polyether oligomer or a polyalkylene ether, for example, poly(ethylene oxide), then block copoly(amide-ethers) result. If the lower softening point material of the block copoly(amide) copolymer is an ester, for example, a polylactone such as polycaprolactone, then block copoly(amide-esters) result. Any of the lower softening point materials cited in the description of the block copoly(ester) copolymers above may be used to form a block copoly(amide) copolymer. Optionally, the lower softening point material of the block copoly(amide) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(amide) copolymer TPE is a block copoly(amide-estar), a block copoly(amide-ether), or mixtures thereof. More preferably, the block copoly(amide) copolymer TPE is at least one block copoly(amide-ether) or mixtures thereof. Suitable commercially available thermoplastic copoly(amide-ethers) include the PEBAX® series from Elf-Atochem, which includes PEBAX® 2533, 3533, 4033 and 6333; the GRILAMID® series by Emser, which included Ely 60; and VESTAMID® and VESTENAMER® by Hüls.

Block copoly(urethane) copolymer TPEs (category (3)) comprise alternating blocks of a polyurethane oligomer (material with the higher softening point) and another block with a lower softening point. The polyurethane block comprises a diisocyanate, typically 4,4'-diphenylmethane diisocyanate, 4,4'-dicyclohexylmethane diisocyanate, 2,4-toluene diisocyanate, 2,6-toluene diisocyanate, paraphenylene diisocyanate or mixtures thereof, chain-extended with a diol such as 1,4-butanediol, a dithiol such as 1,4-butanedithiol, a thio-substituted alcohol, such as 1-thiolbutane-4-ol, or mixtures thereof. Optionally, the block copoly(urethane) copolymer can be at least partially comprised of at least one dithioigocyanate, If the lower softening point material of the block copoly (urethane) copolymer is, e.g., a polyether oligomer or a polyalkylene ether, for example, poly(ethylene oxide), then block copoly(urethane-ethers) result. If the lower softening point material of the block copoly(urethane) copolymer is an ester, for example, a polylactone such as polycaprolactone, then block copoly(urethane-esters) result. Any of the lower softening point materials cited in the description of the block copoly(ester) copolymers above may be used to form a block copoly(urethane) copolymer. For example, if the lower softening point material is an α,ω-hydroxybutadione oligomer, optionally at least partially hydrogenated, then block copoly(urethane-α,ω-hydroxybutadienes) result. Optionally, the lower softening point material of the block copoly(urethane) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(urethane) copolymer TPE is a block copoly(urothana-ester), a block copoly(urethane-ether), or mixtures thereof. Examples of suitable commercially available thermoplastic polyurethanes include the ESTANE® series from the B.F. Goodrich Company, which includes ESTANE® 58133, 58134, 58144 and 58311; the PELLETHANE® series from Dow Chemical, which includes PELLETHANE® 2102-90A and 2103-70A; ELASTOLLAN® from BASF; DESMOPAN® and TEXIN® from Bayer; and Q-THANE® from Morton International.

Block polystyrene TPEs (category (4)) comprise blocks of polystyrene or substituted polystyrene, e.g., poly(α-methyl styrene) or poly(4-methyl styrene), (material with the higher softening point) chemically linked or joined to the ends of lower softening point blocks of either a rubber with unsaturation or a saturated rubber. Unsaturated rubber types typically include butadiene, to form styrene-butadiene-styrene (hereafter "SBS"), or isoprene, to form styrene-isopreng-styrene (hereafter "SIS") block copolymers. Examples of suitable commercially available thermoplastic SBS or SIS copolymers include the KRATON® D series from Shell Chemical, which includes KRATON® D2109, D5119 and D5298; and FINAPRENE® from Fina Oil and Chemical.

Alternatively, the polystyrene blocks of polystyrene TPEs are joined to the ends of substantially saturated rubber blocks. Saturated rubber types typically include butyl rubber or hydrogenated butadine. The latter styrene-(hydrogenated butadiene)-styrene TPEs, wherein the degree of hydrogenation may be partial or substantially complete, are also known as SEBS. Additionally, copolymers of ethylene and propylene or ethylene and butylene can be chemically linked to polystyrene blocks to form styrene-copolyethylene-styrene (hereafter "SES"). Examples of suitable commercially available thermoplastic SES copolymers include the KRATON® G series from Shell Chemical, which includes KRATON® G2705, G7702, G7715 and G7720; SEPTON® from Kuraray; and C-FLEX® from Concept.

All of the above-described category (4) TPEs are nonpolar TPEs because they comprise substantially no atoms other than carbon and hydrogen.

Sulfonated SEBS and SES ionomers are disclosed in U.S. Pat. No. 5,239,010.

Additionally, block polystyrene TPEs may be functionalized with polar moieties by grafting a functional comonomer, e.g., a reactive monomer such as maleic anhydride, onto the TPE in a post-polymerization reaction. Such category (4) TPEs are, therefore, polar TPEs. Examples of commercially available styrene-bloch elastomers functionalized by grafting include the KRATON® series from the Shell Corporation, which includes KRATON® FG1901X and FG1921X. Furthermore, block polystyrene TPEs may be functionalized with hydroxy or epoxy substitution at the polymer chain ends to yield a polar TPE. An example of a commercially available polar TPE styrene-block elastomer functionalized by hydroxy termination is SEPTON® HG252 from the Mitsubishi Chemical company.

Preferably, the block polystyrene TPE comprises an unsaturated rubber, i.e., a nonpolar TPE, a functionalized substantially saturated rubber, i.e., a polar TPE, or mixtures thereof. More preferably, the block polystyrene TPE is a polar TPE, e.g., comprises an unsaturated rubber functionalized by grafting with maleic anhydride, an unsaturated rubber functionalized by hydroxy termination, a substantially saturated rubber functionalized by grafting with maleic anhydride, a substantially saturated rubber functionalized by hydroxy termination, or mixtures thereof. Most preferably, the block polystyrene TPE comprises a polar TPE, i.e., SBS or SIS functionalized by grafting with maleic anhydride, SEBS or SES functionalized by grafting with maleic anhydride, or mixtures thereof.

Unlike the previous four groups of TPEs, wherein the components are linked chemically, the TEB (category (5)) and the TEDV (category (6)) groups are commonly prepared by blending a relatively harder thermoplastic and a relatively softer polymer, which functions like an elastomer. Blending is usually accomplished by mechanical mixing of the two polymer types but in-situ polymerization or grafting may also be employed. At the completion of blending, the two polymer components form a finely interdispersed multiphase morphology which is optionally linked by covalent chemical bonds. The dispersion is fine enough such that the resulting blend has the mechanical properties and performance typically expected of a TPE. Typically, the harder polymer is the continuous phase since it is usually present in greater quantity. These blended TPEs can be further characterized by whether the softer, elastomeric component is intentionally vulcanized or substantially free of crosslinks.

The TEBs (category (5)) are comprised of thermoplastic and elastomer blends wherein the elastomer is not intentionally crosslinked or vulcanized. Typically, a nonpolar TPE is obtained when the harder polymer component is a polyolefin, preferably comprising propylene units, while a polar TPE is obtained when the harder polymer component is polyvinylchloride or a halogenated polyolefin, preferably comprising propylene units. The softer or elastomeric polymer is typically an ethylene-propylene-diene terpolymer (hereafter "EPDM"), ethylene-propylene copolymer rubber (hereafter "EPR") or nitrile rubber. Suitable TEBs include TELCAR® from Teknor Apex, which includes TELCAR 302; TPR® from Advanced Elastomer Systems; RENFLEX® from Dexter; and POLYTROPE® from Schulman.

Sulfonated EPDM is disclosed in U.S. Pat. No. 3,642,728. Phosphonated EPR is disclosed in U.S. Pat. Nos. 3,097,194 and 4,255,540 and in British Patent No. 849,058. Phosphonated EPR ionomers are disclosed in U.S. Pat. No. 4,255,540.

Preferably, the TEB is selected from the group consisting of a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, and mixtures thereof.

Preferably, however, when the polymer component of a golf ball cover of the present invention consists essentially of a sulfonated TEB substrate, with or without a co-component polymer being present, the TEB is a polar TEB comprising polyvinylchloride, a halogenated polyolefin comprising propylene, or mixtures thereof.

The second group of thermoplastic and elastomer blends, the TEDVs (category (6)), are comprised of thermoplastic and elastomer or rubber blends wherein the elastomer is intentionally crosslinked or dynamically vulcanized. This terminology arises because, in typical TEDV blending processes, the elastomer phase is intentionally crosslinked or vulcanized while the melt is subjected to intense shearing fields during blending, in contrast to the quiescent conditions usually present when rubber is vulcanized. The harder polymer component of a TEDV is typically identical to those used in TEBS, thus, the TEDV can be either a polar on nonpolar TPE. The softer or elastomeric polymer of a TEDV is usually natural, nitrile or butyl rubber or EPDM. Suitable TEDVs include SANTOPRENE®, VYRAM® and TREFSIN® from Advanced Elastomer Systems, which includes SANTOPRENE® 101-73 and 203-40 and TREFSIN® 3201-60; the SARLINK® 2000 and 3000 series from DSM; and TELPRENE® from Teknor Apex. In particular, a melt-bondable TEDV, i.e., a polar TFE, is preferred when used in blends comprising polar polymers, such as polyamide and polycarbonate. An exemplary melt-bondable TEDV is available as SANTOPRENE® from Advanced Elastomer Systems and is thought to comprise a polypropylene-EPDM TEDV (wherein the EPDM is vulcanized with peroxide) to which maleic anhydride is grafted.

Preferably, the TEDV comprises polypropylene and EPDM; polypropylene and EPR; polypropylene, EPDM and EPR; a melt-bondable TEDV; or mixtures thereof. More preferably, the TEDV is a polar TPF and comprises at least one melt-bondable TEDV.

Preferably, in forming a sulfonated and/or phosphonated ionomer from the TFE substrate, the TPE is sulfonated. Preferably, the sulfonated TPE is a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, or mixtures thereof.

Preferably, however, when the polymer component of a golf ball cover of the present invention consists essentially of a TPE substrate, with or without a co-component polymer being present, the TPE comprises a polar TPE which is then sulfonated. Preferably, the sulfonated polar TPE is a block copoly(ester-ester); a block copoly(ester-ether); a block copoly(amide-ester); a block copoly(amide-ether); a block copoly(urethane-ester); a block copoly(urethane-ether); a block polystyrene thermoplastic elastomer comprising a functionalized substantially saturated rubber; a TEB wherein the elastomer is not vulcanized and the thermoplastic comprises polyvinylchloride, a halogenated polyolefin comprising propylene or mixtures thereof; a melt-bondable TEDV; or mixtures thereof.

Prior to sulfonation and/or phosphonation, the TPE substrate of this invention has a Shore A hardness of at least about 40 or a Shore D hardness of at least about 15, as measured by ASTM method D-2240. Preferably, the Shore D hardness is from about 15 to about 75, more preferably from about 25 to about 55. Prior to sulfonation and/or phosphonation, the TPE substrate of this invention has a flexural modulus, as measured by ASTM method D-790, of at least about 1,000 psi, preferably from about 1,000 psi to about 150,000 psi, more preferably from about 1,000 psi to about 85,000 psi.

After sulfonation and/or phosphonation, the sulfonated and/or phosphonated TPE polymer has a Shore A hardness of at least about 60 or a Shore D hardness of at least about 20, as measured by ASTM method D-2240. Preferably, the Shore D hardness is from about 20 to about 80, more preferably from about 25 to about 70. After sulfonation and/or phosphonation, the TPE substrate has a flexural modulus, as measured by ASTM method D-790, of at least about 1,000 psi, preferably from about 1,000 psi to about 150,000 psi, more preferably from about 1,000 psi to about 80,000 psi.

Other substrates which can be sulfonated and/or phosphonated then formed into ionomers useful for golf ball compositions can be described as thermoplastic polymers. In particular, the core and/or layer(s) of the present invention may comprise a thermoplastic polymer which is a thermoplastic: or an engineering plastic such as: polyolefin; polycarbonate; polyamide; polyphenylene oxide; imidized, amino group containing polymers; high impact polystyrene (hereafter "HIPS"); polyether ketone; polysulfone; poly(phenylene sulfide); poly(ether imide); reinforced engineering plastics; acrylic-styrene-acrylonitrile; poly(N-octadecylacrylamide); poly(octadecyl methacrylate); poly(4-dodecylstyrene); poly(4-tetradecylstyrene); poly(ethylene oxide); poly(oxymethylene); poly(silazane); poly(furan tetracarboxylic acid diimide); poly(acrylonitrile); poly(α-methylstyrene); as well as the classes of polymers to which they belong and their copolymers, including those comprising a functional comonomer; and blends thereof.

When the core and/or layer(s) of the present invention comprise a polyamide (PA) substrate, preferably the polyamide has an aromatic group, vinyl unsaturation or both of these characteristics. More preferably, the polyamide comprises an aromatic group, e.g., isophthalic acid (hereafter "I"), terephthalic acid (hereafter "T") or 2,6-naphthalenedicarboxylic acid (hereafter "N"). The aromatic group can be present in the main polyamide chain, in a side-group attached to the main polyamide chain, or both. Preferably, the aromatic group of a sulfonated and/or phosphonated polyamide ionomer is present in the main polyamide chain. Preferably, the monomer used to form the polyamide comprising an aromatic group comprises m-phenylenediamine, p-phenylenediamine, m-xylenediamine, isophthalic acid, terephthalic acid, 2,6-naphthalenedicarboxylic acid or mixtures thereof. Preferably, the polyamide comprising an aromatic group is a copolyamide. Polyamide copolymers are commonly designated by separating the symbols for the homopolymers by the symbol "/". For the purposes of this invention, the component named first can be either the major or a minor component of the copolymer. Examples of copolyamides comprising an aromatic group include but are not limited to PA-6,T/6,6; PA-6,T/6,I/6,6; PA-6,T/6; PA-6,T/6,I; PA-6,T/6,6 or mixtures thereof.

In addition, the thermoplastic polymer substrate may be an olefinic polymer, i.e., a polymer comprising an olefin. The olefinic polymers useful in the invention may be polymers formed with the use of metallocene or single-site catalyst technology, and, thus, as used in discussing the present invention, these polymers are also referred to as "metallocene or single-site catalyzed" polymers and copolymers. Metallocene or single-site catalyzed polymers may also comprise functional groups such as epoxy, anhydride, amine, oxazoline, sulfonic acid, carboxylic acid and their salts.

As used herein, the term "olefinic polymer" means a polymer or copolymer comprised of at least one olefin with attached linear or branched alkyl groups having from about 1 to about 18 carbon atoms. The term "olefinic polymer" is specifically meant to include the following materials: a polymer comprising an α-olefin containing from 2 to 10 carbon atoms; polymers formed with the use of metallocene or single-site catalysts and comprising monomers selected from the group consisting of butene, hexene, and octene; polymers formed with the use of metallocene or single-site catalysts and selected from the group consisting of a copolymer of ethylene and butene, a copolymer of ethylene and hexene and a copolymer of ethylene and octene; a terpolymer formed with the use of metallocene or single-site catalysts and consisting essentially of a polymer of ethylene, propylene, and a diene monomer; copoly(ethylene-vinyl alcohol); a copolymer consisting essentially of an α-olefin monomer containing from 2 to 10 carbon atoms and an alkyl acrylate or an alkyl alkylacrylate monomer, wherein each alkyl group ranges, independently, from methyl to decyl inclusive and may be linear or branched; a copolymer consisting essentially of an α-olefin monomer containing from 2 to 10 carbon atoms and a glycidyl acrylate or a glycidyl alkylacrylate monomer, wherein the alkyl group ranges from methyl to decyl inclusive and may be linear or branched; a terpolymer consisting essentially of an α-olefin monomer containing from 2 to 10 carbon atoms, an alkyl acrylate or an alkyl alkylacrylate monomer, and a glycidyl acrylate or a glycidyl alkylacrylate monomer, wherein each alkyl group ranges, independently, from methyl to decyl inclusive and may be linear or branched; a copolymer consisting essentially of an α-olefin monomer containing from 2 to 10 carbon atoms and a vinyloxazoline or 1-alkyl vinyloxazoline monomer, wherein the alkyl group ranges from methyl to decyl inclusive and may be linear or branched; a terpolymer consisting essentially of an α-olefin monomer containing from 2 to 10 carbon atoms, an alkyl acrylate or an alkyl alkylacrylate monomer, and a vinyloxazoline or 1-alkyl vinyloxazoline monomer, wherein each alkyl group ranges, independently, from methyl to decyl inclusive and may be linear or branched; a copolymer consisting essentially of an α-olefin monomer containing from 2 to 10 carbon atoms and carbon monoxide; a terpolymer consisting essentially of a first α-olefin monomer containing from 2 to 10 carbon atoms, a second α-olefin monomer containing from 2 to 10 carbon atoms, and carbon monoxide; a copolymer consisting essentially of an α-olefin monomer containing from 2 to 10 carbon atoms and sulfur dioxide; a terpolymer consisting essentially of a first α-olefin monomer containing from 2 to 10 carbon atoms, a second α-olefin monomer containing from 2 to 10 carbon atoms, and sulfur dioxide; a copolymer consisting essentially of an α-olefin monomer containing from 2 to 10 carbon atoms and maleic anhydride; a terpolymer consisting essentially of an α-olefin monomer containing from 2 to 10 carbon atoms, maleic anhydride, and carbon monoxide; a terpolymer consisting essentially of an α-olefin monomer containing from 2 to 10 carbon atoms, maleic anhydride, and sulfur dioxide; and a terpolymer consisting essentially of an α-olefin monomer containing from 2 to 10 carbon atoms, maleic anhydride, and an alkyl acrylate or an alkyl alkylacrylate monomer, wherein each alkyl group ranges, independently, from methyl to decyl inclusive and may be linear or branched.

As used herein, the phrase "linear or branched alkyl groups of up to about 18 carbon atoms" means any substituted or unsubstituted acyclic carbon-containing compound, including alkanes, alkenes and alkynes. As used herein, the phrase "alkyl group ranges from methyl to decyl inclusive and may be linear or branched" means any substituted or unsubstituted acyclic carbon-containing compounds, including alkanes, alkenes and alkynes.

Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, butadiene, pentene, hexene, heptene, octene, norbornene, nonene, decene and the like. The ordinary skilled artisan is familiar with numerous linear and branched alkyl groups, which are within the scope of the present invention.

Additionally, such alkyl groups may also contain various substituents in which one or more hydrogen atoms has been replaced by a functional group. Functional groups include but are not limited to hydroxyl, amino, epoxy, carboxyl, sulfonic amide, ester, ether, phosphates, thiol, nitro, silane and halogen (fluorine, chlorine, bromine and iodine), to mention but a few.

Any of the olefinic polymers may also be functionalized by grafting with, e.g., maleic anhydride. Furthermore, the term "olefinic polymers" also encompasses mixtures of at least two olefinic polymers.

Phosphonated polyethylene is disclosed by Weiss et al., *J. Polym. Sci., Polym. Phys.*, 15:1409 (1977). Phosphonated polypropylene is disclosed in British Patent No. 907,765. Phosphonated poly(4-methylpentene-1) is disclosed in U.S. Pat. No. 3,397,219.

The copolymers formed with the use of metallocene or single-site catalysts useful in the present invention are commercially available under the trade name AFFINITY® polyolefin plastomers and ENGAGE® polyolefin elastomers by DuPont-Dow Elastomers Company and they are described more fully in U.S. Pat. Nos. 5,272,236 and 5,278, 272. Other commercially available polymers formed with the use of metallocene or single-site catalysts can be used, such as Exxon Chemical Company's EXACT® and Dow Chemical's INSIGHT® lines of resins, which have superior flexibility and clarity as well as toughness. The EXACT® and INSIGHT® lines of polymers also have novel rheological behavior in addition to their other properties as a result of using a metallocene or single-site catalyst technology. The method of making EXACT® and INSIGHT® polymers and their compositions are more fully detailed in U.S. Pat. Nos. 5,359,015 and 5,281,679.

As used herein, the term "poly(alkyl)alkylacrylate" means a thermoplastic polymer or copolymer comprised of at least one (alkyl)alkylacrylate or (alkyl)acrylate monomer unit, wherein each alkyl group ranges, independently, from methyl to decyl inclusive and may be linear or branched, where this term is as defined above. Exemplary (alkyl)alkylacrylate or (alkyl)acrylate monomer units include but are not limited to acrylate, methacrylate, ethacrylate, methyl acrylate, ethyl acrylate, methyl methacrylate, ethyl methacrylate, methyl ethacrylate and ethyl ethacrylate. The term "poly(alkyl)alkylacrylate" is specifically meant to include the following materials: poly(methyl acrylate) and poly(methyl methacrylate).

Any poly(alkyl)alkylacrylate may also be functionalized by grafting with, e.g., maleic anhydride. Furthermore, the term "poly(alkyl)alkylacrylate" also encompasses mixtures of at least two poly (alkyl)alkylacrylates.

Preferably, the thermoplastic polymer substrate is an ethylene or propylene based homopolymer or copolymer (including functional monomers such as acrylic and methacrylic acid, such as the ethylene-methyl acrylate or ethylene-butyl acrylate copolymer series available from Quantum Chemical); polymers formed with the use of metallocene or single-site catalysts and consisting essentially of a copolymer of ethylene and butene, a copolymer of ethylene and hexene or a copolymer of ethylene and octene; a terpolymer formed with the use of metallocene or single-site catalysts and consisting essentially of a polymer of ethylene, propylene and a diene monomer; poly(amide); poly(methyl acrylate); poly(methyl methacrylate); acrylonitrile-butadiene-styrene copolymer (hereafter "ABS"); poly(alkyl)alkylacrylate; a polymer comprising an α-olefin containing from 2 to 10 carbon atoms; and their copolymers, including those comprising a functional comonomer; and blends thereof.

More preferably, the thermoplastic polymer substrate comprises an aryl group. Such thermoplastic polymers include but are not limited to polyesters, such as poly (ethylene terephthalate), e.g., EKTAR® available from Eastman Kodak, poly(butylene terephthalate), poly(trimethylene terephthalate), e.g., CORTERRA® available from Shell Chemical, and poly(ethylene naphthalate) available from ICI Polyester and Teijin Chemical; polyamide, such as PA-6,T/6,6 and PA-6,T/6,I/6,6; polycarbonate; polyphenylene oxide; polyether ketone; polysulfone; poly (phenylene sulfide); poly(ether imide); reinforced engineering plastics comprising an aromatic group; polymers comprising styrene; and blends thereof.

As used herein, the term "polymer comprising styrene" means a thermoplastic polymer or copolymer comprised of at least one styrene monomer unit or at least one substituted styrene monomer unit. A substituted styrene monomer unit may be formed from styrene monomer by substituting the aromatic ring with a linear or branched alkyl group having from about 1 to about 18 carbon atoms, where this term is as defined above. An example of such a substituted styrene monomer is 4-dodecylstyrene. Alternatively, the styrene monomer aromatic ring may be multiply substituted as described above, with each substituent selected independently of any other. An example of such a substituted styrene monomer is 2-ethyl-4-chloromethylstyrene. Further, styrene monomer, substituted styrene monomer, or multiply substituted styrene monomer may be further substituted at the position alpha to the aromatic ring by a linear or branched alkyl group having from about 1 to about 18 carbon atoms, where this term is as defined above and where the alpha substituent is selected independently of any other substituent. Examples of such substituted styrene monomers include but are not limited to α-methylstyrene, α-methyl-4-dodecylstyrene and α-methyl-2-ethyl-4-chloromethylstyrene. The term "polymer comprising styrene" is specifically meant to include the following materials: poly(styrene); poly(α-methylstyrene); poly(4-dodecylstyrene); poly(4-tetradecylstyrene); acrylic-styrene-acrylonitrile copolymer; ABS; HIPS; a copolymer Consisting essentially of a styrene or an α-alkyl styrene monomer and a vinyloxazoline or a 1-alkyl vinyloxazoline monomer, wherein the alkyl groups range, independently, from methyl to decyl inclusive and may be linear or branched; and a terpolymer consisting essentially of a styrene or an α-alkyl styrene monomer, an alkyl acrylate or an alkyl alkylacrylate monomer, and a vinyloxazoline or a 1-alkyl vinyloxazoline monomer, wherein the alkyl groups range, independently, from methyl to decyl inclusive and may be linear or branched.

Any of the polymers comprising styrene may also be functionalized by grafting with, e.g., maleic anhydride. Furthermore, the term "polymer comprising styrene" also encompasses mixtures of at least two polymers comprising styrene.

If desired, the thermoplastic substrate may comprise an impact modifier or a toughened or impact-modified material, such as ABS, or preferably HIPS.

Before sulfonation and/or phosphonation, the thermoplastic polymer substrate has a Shore D hardness of at least about 15, preferably from about 15 to about 80, more preferably from about 20 to about 75, as measured by ASTM method D-2240, and a flexural modulus, as measured by ASTM method D-790, of at least about 5,000 psi, preferably from about 5,000 psi to about 500,000 psi, more preferably from about 10,000 psi to about 300,000 psi.

After sulfonation and/or phosphonation, the sulfonated and/or phosphonated thermoplastic polymer has a Shore D hardness of at least about 20, preferably from about 20 to about 85, as measured by ASTM method D-2240, a flexural modulus, as measured by ASTM method D-790, of at least about 10,000 psi, preferably from about 3,000 psi to about 500,000 psi, and a melt index from about 0.3 to about 50 g/10 min, as measured by ASTM method D-1238, condition E using a 2.16 kg weight.

Still other substrates which can be sulfonated and/or phosphonated to form a sulfonated and/or phosphonated polymer, formed into an ionomer, and then blended with polyamides to form the blends of the claimed invention in forming golf ball compositions can be described as thermoset polymers. As used in discussing the present invention, "thermoset polymer" also includes functionalized thermoset polymers, thermoset copolymers, functionalized thermoset copolymers, and mixtures thereof.

The thermoset polymers of this invention can be characterized, by chemical composition, into polar thermoset polymers and nonpolar thermoset polymers. As used herein, a "nonpolar thermoset polymer" comprises substantially no atoms other than carbon, nitrogen and hydrogen. Nonpolar thermoset polymers are often formed from nonpolar monomers, e.g., monomers comprising substantially no atoms other than carbon, nitrogen and hydrogen. As known to those of ordinary skill in the polymer art, even nonpolar thermoset polymers may contain some non-carbon, non-nitrogen and non-hydrogen atoms. For example, it is common for initiator fragments, oxygenated by-products formed by oxidation, or crosslinking agents, such as sulfur-containing compounds, to be present even in a nonpolar thermoset polymer. As used herein, a "polar thermoset polymer" comprises atoms other than carbon, nitrogen and hydrogen. Polar thermoset polymers are commonly formed from at least one polar monomer, e.g., a monomer comprising oxygen or a halogen atom.

Nonpolar thermoset polymers include but are not limited to nonpolar rubbers, such as poly(isoprene), both natural and synthetic; poly(butadiene); poly(octenemer); styrena-butadiene rubber; EPDM rubber; EPR; nitrile rubber; and butyl rubber. Polar thermoset polymers include but are not limited to polar rubbers, such as poly(chloroprene); poly (urethane); poly(urea); poly(siloxane); chlorotrif luoroeth-ylene copolymer rubber; vinylidene fluoride-hexafluoropropylene copolymer rubber; polysulf ide rubber; and epichlorohydrin rubber. Other polar thermoset polymers include polymers which are crosslinked or crosslinkable, such as unsaturated poly(ester); phenolic resin; epoxy resin; silicone polymers; alkyd resin; allyl resin; and furane resin. Thermoset polymegr also include ally thermoplastic polymer which may be crosslinked.

Sulfonated polybutadiene, sulfonated polyisoprene and sulfonated butyl rubber are disclosed in U.S. Pat. No. 3,642,728. Zinc ionomers formed from sulfonated trans-polybutadiene, trans-polyisoprene and trans-polyoctenemer, all with at least 60% trans-1,4-configuration content, are disclosed in Japanese patent publication JP 8-103516 A.

Preferably, the thermoset polymer subgtrate comprises polybutadiene, polyisoprene, thermoset poly(urethane) such as those described by U.S. Pat. No. 5,334,673, thermoset poly(urea) such as those described by U.S. Pat. No. 5,484,870, or mixtures thereof. More preferably, the thermoset polymer substrate is a polar thermoset polymer including but not limited to a thermoset poly(urethane), a thermoset poly (urea), or mixtures thereof.

Before sulfonation and/or phosphonation, the thermoset polymer substrate has a Shore D hardness of at least about 15, preferably from about 15 to about 80, more preferably from about 20 to about 80, as measured by ASTM method D-2240, and a flexural modulus, as measured by ASTM method D-790, of at least about 1,000 psi, preferably from about 1,000 psi to about 100,000 psi, more preferably from about 1,000 psi to about 50,000 psi, After sulfonation and/or phosphonation, the sulfonated and/or phosphonated thermoset polymer has a Shore D hardness of at least about 20, preferably from about 25 to about 80, as measured by ASTM method D-2240, a flexural modulus, as measured by ASTM method D-790, of at least about 1,000 psi, preferably from about 1,000 psi to about 150,000 psi, more preferably from about 1,000 psi to about 50,000 psi.

Sulfonated and/or phosphonated ionomers may be formed from sulfonated and/or phosphonated polymers by methods well known to those in the art; see, for example, W. J. MacKnight and T. R. Earnest [J. Polym. Sci., Macromol. Rev., 16:41–122 (1981)]. Typically, sulfonic and/or phosphonic acid groups of the sulfonated and/or phosphonated polymer are at least partially neutralized with a base, preferably a metal base, to form an ionomer. For example, Z. Gao et al. disclose that a sulfonated polystyrene ionomer neutralized by sodium ions and by lithium ions may be formed from sulfonated polystyrene by preparing a solution of the polymer in 80:20 benzene:methanol and then quantitatively neutralizing the sulfonic acid groups of the polymer by adding methanol solutions of sodium hydroxide and lithium hydroxide, respectively. In addition, U.S. Pat. No. 4,255,540 discloses that a phosphonated ethylene-propylene ionomer neutralized with zinc may be formed from the phosphonic acid groups of a phosphonated ethylene-propylene copolymer by adding a solution of a basic salt, such as zinc acetate in water and/or an aliphatic alcohol, to a solution of the phosphonated ethylene-propylene copolymer in a aliphatic alcohol/nonreactive solvent blend.

In an additional exemplary method to form a sulfonated and/or phosphonated ionomer, sulfonate ester and/or phosphonate ester moieties of a sulfonated and/or phosphonated polymer may be at least partially hydrolyzed or saponified by a base, preferably a metal base, to form the ionomer. For example, a sulfonated polystyrene ionomer neutralized by sodium may be formed from sulfonated polystyrene containing sulfonate groups by heating a mixture of the sulfonated polystyrene, sodium hydroxide and water. Alternatively, it is possible to supply aqueous sodium hydroxide to an addition zone of an extruder conveying molten rulfonated polystyrene and then at least partially melt-saponify the sulfonate groups to form a sulfonated polystyrene ionomer neutralized by sodium.

The base need not comprise a metallic cation. For example, the base may contain a quaternary phosphonium or ammonium cation, such as a tetraalkyl phosphonium halide or ammonium hydroxide. However, if the base is a metal base, the metal base is comprised of at least one metallic cation selected from the group consisting of the following periodic table groupings IA, IB, IIA, IIB, IIIA, IIIB, IVA, IVB, VA, VB, VIA, VIIB, and VIII. Preferably, the metal base is comprised of at least one metallic cation selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn and Pb. More preferably, the metal base is comprised of at least one metallic cation selected from the group consisting of Li, Na, K, Mg, Ca, Ba, Zn, Ti, Zr, W and Pt.

The base of this invention is further comprised of at least one anion selected from the group consisting of hydroxide, alkoxide, acetate, carbonate, bicarbonate, oxide, formate and nitrate. Preferably, the base of this invention is further comprised of at least one anion selected from the group consisting of Li, Na, Mg, Zn, Ti, Zr, W and Pt.

The metal base, when present, may be used in neat form, e.g., as a powder or pellet, or in the form of a solution, e.g., metal base dissolved in at least one solvent. Preferably, the metal base is used as an aqueous solution when preparing sulfonated and/or phosphonated ionomers from sulfonated and/or phosphonated polymers.

Preferably, the quantity of the total sulfonate and/or phosphonate moieties of a sulfonated and/or phosphonated polymer neutralized or hydrolyzed by the base to their ionic form ranges from about 1 mol % to about 90 mol % in the sulfonated and/or phosphonated ionomer. More preferably at least about 10 mol %, most preferably at least about 20 mol %, of the sulfonate and/or phosphonate moieties are present in their ionic form. The extent of neutralization may be readily analyzed by titration methods.

If desired and in addition to the ionic moieties formed by neutralization or hydrolysis, the sulfonated and/or phosphonated ionomer may also contain acid moieties, i.e., sulfonic and/or phosphonic acid, and ester moieties, i.e., sulfonate and/or phosphonate esters. When present, the percentage, in mol %, of ionic/acid/ester moieties, respectively, ranges from about 1/1/30 to about 90/70/70 provided that the total amount of ionic, acid and ester moieties present is 100 mol %. The amount of acid groups present may be readily analyzed by titration methods.

The ionomer formed from a gulfonated and/or phosphonated polymer has a Shore A hardness of at least about 40 or a Shore D hardness of at least about 15, as measured by ASTM method D-2240. Preferably, the Shore D hardness is from about 20 to about 80, more preferably from about 25 to about 70. The sulfonated and/or phosphonated ionomer has a flexural modulus, as measured by ASTM method D-790, of at least about 1,000 psi, preferably from about 3,000 psi to about 100,000 psi, more preferably from about 3,000 psi to about 80,000 psi.

While not wishing to be bound by any particular theory, sulfonated ionomers are thought to exhibit desirable properties because of the higher ionic strength of sulfonic acids, as compared to carboxylic acids. Thus, sulfonic acids and their salts are thought to form more polar aggregates, sometimes known as clusters. A higher degree of aggregation typically results in a higher glass transition temperature and higher melt viscosity for sulfonated ionomers relative to conventional ionomers. Thus, a lower amount of sulfonation, as compared to carboxylation, is thought to be necessary to achieve a particularly desirable property level, e.g., of a mechanical property such as the flexural modulus. Alternatively, because the sulfonated ionomer aggregates are more polar, lower degrees of neutralization and/or lower levels of multivalent cations are thought to be required to achieve a desired property level.

Furthermore, as phosphonic acids are even stronger acids than sulfonic acids, phosphonated ionomers are believed to form even more polar aggregates than sulfonated ionomers. Thus, a lower amount of phosphonation, as compared even to sulfonation, is thought to be necessary to achieve a particularly desirable property level. Therefore, the compositions of the present invention provide vast flexibility in achieving a balance of properties desirable for use in golf balls by allowing for the formation of blends of sulfonated ionomers, blends of phosphonated ionomers, blends of sulfonated and phosphonated ionomer, and combinations of any of the aforementioned blends, all optionally blended with at least one co-component polymer, such as a conventional ionomer.

Preferably, sulfonated ionomers formed from polymers and copolymers comprising sulfonate groups are used to form the blends of this invention. As used herein, "sulfonate groups" includes sulfonic acid, sulfonate ester and sulfonamide forms which may be present as any or all combinations thereof before the ionomer is formed. More preferably, the sulfonated ionomers used to form the blends of this invention are formed from sulfonated polymers comprising sulfonic acid groups, sulfonamide groups or mixtures thereof.

Optionally, the sulfonated and/or phosphonated ionomer may be mixed with at least one co-component polymer to form a composition of the invention. As used herein, a "co-component polymer" is a polymer or copolymer which is a non-ionomer polymer or a conventional ionomer, i.e., not an ionomer formed from a sulfonated and/or phosphonated polymer. As used herein, a "non-ionomer polymer" is a polymer or copolymer which comprises substantially no ionic groups, i.e., a polymer or copolymer which is not an ionomer. For example, non-ionomer polymer may be a TPE, a thermoplastic polymer, a thermoset polymer, or any mixture thereof, none of these materials being ionomers.

As discussed in detail above, a conventional ionomer is a polymer which comprises carboxylic acid groups or basic groups, such as quaternary nitrogen, the acidic or basic groups being at least partially neutralized with a conjugate base or acid, respectively. Generally speaking, conventional ionomers consist of a copolymer of a mono-olefin with at least one comonomer selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof) with from about 10% to about 90% of the carboxylic acid groups neutralized by a metal ion, e.g., see U.S. Pat. No. 3,264,272. More particularly, such acid-containing ethylene copolymer ionomers include commercially available E/X/Y copolymers where E is ethylene, X is a softening comonomer such as an alkyl acrylate or alkyl methacrylate present in an amount of from 0 wt. % to about 50 wt. % of the polymer, and Y is acrylic or methacrylic acid present in an amount from about 5 wt. % to about 35 wt. % of the polymer, wherein the acid moiety is neutralized from about 1% to about 90% to form an ionomer by a cation such as lithium, sodium, potassium, magnesium, calcium, barium, lead, tin, zinc or aluminum, or a combination of such cations.

Preferably, the conventional ionomer comprises a so-called "high acid" ionomer, for example, a copolymer of an olefin, e.g. ethylene, an optional softening comonomer, and at least 16 wt. % of an α,β-ethylenically unsaturated carboxylic acid, e.g., acrylic or methacrylic acid, wherein from about 10% to about 90% of the carboxylic acid groups are neutralized with a metal ion, e.g., zinc, sodium, magnesium or lithium. Preferably, the high acid ionomer is a copolymer of ethylene and about 17–20 wt. % methacrylic acid wherein from about 35% to about 65% of the carboxylic acid groups are neutralized by sodium. Examples of commercially available high acid ionomers, both available from DuPont, include SURLYN® 8140, which is an ethylene-based ionomer believed to comprise 17–20 wt. % methacrylic acid and to be neutralized with sodium, and SURLYN® AD 8546, which is an ionomer believed to comprise 17–20 wt. % methacrylic acid and to be neutralized with lithium.

Alternatively, the co-component polymer may be a non-ionomer polymer, for example, a thermoplastic polymer, a TPE or a thermoset polymer. In particular, when the core and/or layer(s) of the present invention comprises a thermoplastic polymer, such a polymer may be any thermoplastic or engineering plastic such as discussed in detail above.

The non-ionomer polymer optionally mixed with the sulfonated and/or phosphonated ionomer may comprise a polyamide or may comprise polyamide blocks.

The polyamide co-component useful in forming the compositions of this invention is a thermoplastic with repeating amide groups. These are commonly known as nylons. This co-component can be comprised of a homopolymer, a copolymer, including a block copolymer, or a blend of two or more variations of any or all of the above types of polyamides.

Polyamide homopolymers are produced by two common methods. In the first, a compound containing one organic acid-type end-group and one amine end-group is formed into a cyclic monomer. The polyamide is then formed from the monomer by a ring-opening polymerization. These polyamides are commonly designated as polyamide 6, polyamide 11, polyamide 12, etc., where the number indicates the number of carbon atoms making up the ring in the monomer. The second method involves the condensation polymerization of a dibasic acid and a diamine. These polyamides are commonly designated as polyamide 4,6, polyamide 6,6, polyamide 6,9, polyamide 6,10, polyamide 6,12, etc., where the first number indicates the number of carbon atoms connecting the two amine groups in the diamine and the second number indicates the number of carbon atoms connecting the two acid groups in the dibasic acid, including those in the acid groups.

As known to those in the art, the carbon atom groups connecting the acid and/or amine functional groups are not limited to linear aliphatic groups. For example, the diamine may be alicyclic, such as piperazine (hereafter "PIP"), or branched, such as 2-methylpentamethylenediamine (hereafter "MPMD") or a mixture of 2,2,4- and 2,4,4-trimethylhexamethylenediamine (hereafter "TMD").

Preferred polyamide homopolymers include polyamide 4, polyamide 6, polyamide 7, polyamide 11, polyamide 12, polyamide 13, polyamide 4,6, polyamide 6,6, polyamide 6,9, polyamide 6,10, polyamide 6,12, polyamide 12,12, polyamide 13,13 and mixtures thereof. More preferred polyamide homopolymers include polyamide 6, polyamide 11, polyamide 12, polyamide 4,6, polyamide 6,6, polyamide 6,9, polyamide 6,10, polyamide 6,12 and mixtures thereof. The most preferred polyamide homopolymers are polyamide 6, polyamide 11, polyamide 12 and mixtures thereof.

Alternatively, the polyamide may comprise an aromatic group. For example, a polyamide formed by condensation polymerization may be formed from an aliphatic diacid and a diamine comprising an aromatic group, e.g., m-phenylenediamine (hereafter "MPH"), p-phenylenediamine (hereafter "PPD") or m-xylylenediamine (hereafter "MIX"). The polyamide PA-MIX,6 available as RENY® from Mitsubishi Gas Chem. Co., for example, results from the condensation polymerization of MIX and adipic acid.

Another way to form a polyamide comprising an aromatic group is from a condensation polymerization of an aliphatic diamine and a diacid comprising an aromatic group, e.g., isophthalic acid, terephthalic acid or 2,6-naphthalenedicarboxylic acid. The polyamide PA-TMD,T available as TROGAMID® from Hüls A. G., for example, results from the condensation polymerization of TMD and terephthalic acid.

Still another way to form a polyamide comprising an aromatic group is from a condensation polymerization of a diacid comprising an aromatic group and a diamine comprising an aromatic group. For example, the polyamide PA-PPD,T available as KEVLAR® from DuPont, results from the condensation polymerization of PPD and the diacid chloride derivative of terephthalic acid and the polyamide PA-MPH,I available as NOMEX® from DuPont, results from the condensation polymerization of MPD and the diacid chloride derivative of isophthalic acid.

Preferred aromatic polyamides are formed from the monomers m-phenylenediamine, p-phenylenediamine, m-xylylenediamine, isophthalic acid, terephthalic acid, 2,6-naphthalenedicarboxylic acid and mixtures thereof. Preferred aromatic polyamides include but are not limited to PA-6,T/6,6; PA-6,T/6,I/6,6; PA-6,T/6; PA-6,T/6,I; PA-6,T/6,6 and mixtures thereof.

Polyamide copolymers are produced by several common methods. They are produced from ring-opening polymerization by using two or more cyclic monomers with different numbers of carbon atoms making up each monomeric ring. Additionally, polyamide copolymers are produced from condensation polymerization by using a single dibasic acid and two or more different diamines, e.g., each diamine differing by the number of carbon atoms separating the two amine groups or by the structure of the group, for example, aliphatic, branched, alicyclic, aromatic or aralkyl. Alternatively, polyamide copolymers are produced from condensation polymerization by using a single diamine and two or more different dibasic acids, each differing as described above, or by using two or more different diamines and dibasic acids. Further, polyamide copolymers are produced by blending two or more polyamide melts and holding the materials in the molten state for a sufficient time period such that partial or full randomization occurs. As discussed above, polyamide copolymers are commonly designated by separating the symbols for the homopolymers by the symbol "/"; for the purposes of this invention, the component named first can be either the major or a minor component of the copolymer.

If desired, at least one of these polyamide copolymer components may comprise an aromatic group, thereby producing a polyamide comprising an aromatic group in the form of a mixed aliphatic-aromatic copolyamide. For example, the polyamides PA-6,T/6,6 and PA-6,T/6,I/6,6, available as SUPER AMODEL® and AMODEL A-1000®, respectively, from Amoco, the polyamide PA-6,T/6, available as ULTRAMID T® from BASF, and the polyamides PA-6,T/6,I and PA-6,T/6,6, available as ARLEN A® and ARLEN C®, respectively, from Mitsui may be used.

Preferred polyamide copolymers include polyamide 6/6, 6, polyamide 6,6/6,10, polyamide 6/6,T, polyamide 6/6,6/6,10 and mixtures thereof.

The polyamide co-component of this invention, when present, has a Shore D hardness of at least about 40, as measured by ASTM method D-2240, a flexural modulus, as measured by ASTM method D-790, of at least about 3,000 psi, preferably from about 3,000 psi to about 500,000 psi, more preferably from about 50,000 psi to about 500,000 psi, and a melt index from about 0.5 to about 100 g/10 min, as measured by ASTM method D-1238, condition E using a 2.16 kg weight.

When a composition of the invention further comprises a co-component polymer, the co-component polymer may be a thermoplastic polymer, a thermoplastic elastomer, a thermoset polymer, a conventional ionomer or mixtures thereof.

Preferably, when the co-component non-ionomer polymer is a thermoset polymer, the thermoset polymer comprises poly(urethane), poly(urea), epoxy resin or mixtures thereof. More preferably, the thermoset non-ionomer polymer is poly(urethane), poly(urea), or mixtures thereof.

When a composition of the invention further comprises a co-component polymer, preferably, the co-component polymer is a thermoplastic polymer, a TPE, a conventional ionomer, or mixtures thereof.

The co-component non-ionomer thermoplastic polymer is, preferably, a poly(amide), a polyester, such as poly (ethylene terephthalate), poly(butylene terephthalate), poly (trimethylene terephthalate) or poly(ethylene naphthalate), poly(vinyl alcohol), poly(vinyl acetate), poly(silane), poly (vinylidene fluoride), acrylonitrile-butadiene-styrene copolymer, an olefinic polymer, their copolymers, or mixtures thereof.

More preferably, when the non-ionomer polymer is a thermoplastic polymer, the thermoplastic polymer comprises a polyamide, such as the ZYTEL® series of poly (amides) available from DuPont; a polyester comprising an aromatic group, such as poly(ethylene terephthalate), e.g., EKTAR® available from Eastman Kodak, poly(butylene terephthalate), poly(trimethylene terephthalate), e.g., CORTERRA® available from Shell Chemical and poly(ethylene naphthalate), e.g., available from ICI Polyester and Teijin Chemical; poly(methyl acrylate); poly(methyl methacrylate); poly(vinyl alcohol); poly(vinyl acetate); poly (silane); poly(vinylidene fluoride); acrylonitrile-butadiene-styrene copolymer; poly(alkyl)alkylacrylate; a copolymer consisting essentially of a styrene or an α-alkyl styrene monomer and a vinyloxazoline or a 1-alkyl vinyloxazoline monomer, wherein the alkyl groups range, independently, from methyl to decyl inclusive and may be linear or branched; a terpolymer consisting essentially of a styrene or an α-alkyl styrene monomer, an alkyl acrylate or an alkyl alkylacrylate monomer, and a vinyloxazoline or a 1-alkyl vinyloxazoline monomer, wherein the alkyl groups range, independently, from methyl to decyl inclusive and may be linear or branched; olefinic polymers; and their copolymers, including those comprising a functional comonomer; and blends thereof.

Most preferably, the non-ionomer thermoplastic polymer is a polyamide homopolymer or copolymer, such as polyamide 4, polyamide 6, polyamide 7, polyamide 11, polyamide 12, polyamide 13, polyamide 4,6, polyamide 6,6, polyamide 6,9, polyamide 6,10, polyamide 6,12, polyamide 12,12, polydmide 13,13, polyamide 6/6,6, polyamide 6,6/6,10, polyamide 6/6,T, polyamide 6/6,6/6,10 and mixtures thereof; poly(ethylene terephthalate); poly(butylene terephthalate); poly(trimethylene terephthalate); poly (ethylene naphthalate); an ethylene or propylene based homopolymer or copolymer, such as the ethylene-methyl acrylate or ethylene-butyl acrylate copolymer series available from Quantum Chemical; polymers formed with the use of metallocene or single-site catalysts and consisting essentially of a copolymer of ethylene and butene, a copolymer of ethylene and hexene or a copolymer of ethylene and octene; a terpolymer formed with the use of metallocene or single-site catalysts and consisting essentially of a polymer of ethylene, propylene and a diene monomer; a polymer comprising an α-olefin containing from 2 to 10 carbon atoms; and their copolymers, including those comprising a functional comonomer; and blends thereof.

When a composition of the invention further comprises a co-component non-ionomer TPE, the TPE is, preferably, a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is is dynamically vulcanized, or mixtures thereof.

More preferably, the non-ionomer TPE comprises a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, a thermoplastic and elastomer blend comprising polypropylene and ethylene-propylene-diene terpolymer or ethylene-propylene copolymer rubber wherein the rubber is dynamically vulcanized, or a mixture thereof.

Most preferably, the non-ionomer TPE is a block copoly (amide-ether), a block copoly(ester-ether), a block polystyrene thermoplastic elastomer comprising an unsaturated rubber, a block polystyrene thermoplastic elastomer comprising a functionalized substantially saturated rubber, or mixtures thereof.

When the sulfonated and/or phosphonated ionomer is formed from a sulfonated polyphenylene oxide, a sulfonated polystyrene, or a sulfonated block copoly(urethane) copolymer TPE, the preferred co-component non-ionomer polymer is, respectively, poly(vinyl pyridine), a polymer or copolymer comprising acrylic acid, and a copolymer comprising an olefin or an alkyl (meth)acrylate, such as ethylene-ethylacrylate copolymer.

The co-component polymer generally has a Shore D hardness of at least about 20, preferably from about 25 to about 70, as measured by ASTM method D-2240, and a flexural modulus, as measured by ASTM method D-790, of at least about 1,000 psi, preferably from about 1,000 psi to about 500,000 psi.

In the case of blends of a sulfonated and/or phosphonated ionomer with a co-component polymer, such blends may comprise from about 99% to about 1% by weight of at least one ionomer formed from a sulfonated and/or phosphonated polymer and from about 1% to about 99% by weight of at least one co-component polymer. Preferably, the blend comprises from about 95% to about 5% by weight of the sulfonated and/or phosphonated ionomer and from about 5% to about 95% by weight of the co-component polymer. More preferably, the blend comprises from about 90% to about 15% by weight of the sulfonated and/or phosphonated ionomer and from about 10% to about 85% by weight of the co-component polymer. Most preferably, the blend comprises from about 75% to about 15% by weight of at least one ionomer formed from sulfonated and/or phosphonated polymer and from about 25% to about 85% by weight of at least one co-component polymer.

The polymer blends of this invention can be prepared with blend components of varying molecular architecture as is well known to those knowledgeable in the art of blending polymers. Examples of the parameters which may be varied include molecular weight, molecular weight distribution, tacticity, and optionally, branching, degrees and arrangements of blockiness, block molecular weight and block molecular weight distribution. Also, parameters relating to the amount and type of sulfonation, the amount and type of phosphonation, the distribution of sulfonation and the distribution of phosphonation may be varied. Furthermore, the specific counterion or counterions used to form the ionomer from the sulfonated and/or phosphonated polymer, the percentage of sulfonated and/or phosphonated groups which are neutralized to form the ionomer, and optionally the percentage of sulfonated and/or phosphonated groups of the ionomer which are esterfied, are further examples of the parameters which may be varied in preparing the blend components of this invention.

When an intermediate layer in a golf ball constructed according to the invention comprises a sulfonated and/or phosphonated polyamide ionomer blend, the cover may also comprise at least one conventional ionomer. The conventional ionomer useful in the construction described above may be an ionomer or a functionalized ionomer, a copolymer ionomer or a functionalized copolymer ionomer, or mixtures therof, that comprises, but is not limited to: polyolefin, polyester, block copoly(ether-ester), block copoly(ester-ester), polyamide, polyether, polyurethane, polyacrylate, polystyrene, SBS, SEBS, and polycarbonate, in the form of a homopolymer, a copolymer or a block copolymer conventional ionomer.

Preferably, when an intermediate layer in a golf ball constructed according to the invention comprises a co-component polymer-sulfonated and/or phosphonated ionomer blend or a sulfonated and/or phosphonated polyamide ionomer, the covering comprises at least one material selected from the group consisting of thermoplastic polymers, thermoplastic elastomers, thermoset polymers and conventional ionomer. More preferably, the cover comprises an ionomer comprising at least one material selected from the group consisting of: polyolefin, polyester, polystyrene, SBS, SEBS and polyurethane, in the form of a homopolymer, a copolymer or a block copolymer conventional ionomer; nonionic olefinic homopolymers and copolymers; poly(amide); poly(methyl acryate); poly (methyl methacrylate); ABS; poly(urethane); poly(urea), poly(isoprene) which is at least partially crosslinked; and poly(butadiene) which is at least partially crosslinked.

Most preferably, when an intermediate layer in a golf ball constructed according to the invention comprises a co-component polymer-sulfonated and/or phosphonated ionomer blend or a sulfonated and/or phosphonated polyamide ionomer, the cover comprises at least one material selected from the group consisting of: nonionic olefinic polymers; polyamide; polyolefin conventional ionomers; SBS conventional ionomers; SEBS conventional ionomers; poly(isoprene) which is at least partially crosslinked; poly (butadiene) which is at least partially crosslinked; a thermoset poly(urethane) such as those described by U.S. Pat. No. 5,334,673; and a thermoset poly(urea) such as those described by U.S. Pat. No. 5,484,870.

In a further alternative embodiment, a cover layer, an intermediate layer, and/or a core or core layer in a golf ball comprising a composition according to the invention can be present in the form of a foamed polymeric material. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Either injection molding or compression molding may be used to form a layer or a core comprising a foamed polymeric material. For example, a composition of the present invention can be thermoformed and, thus, can be compression molded. Alternatively, when the layer or the core is injection molded from a composition of the present invention, a physical or chemical blowing or foaming agent may be included to produce a foamed layer. Blowing or foaming agents useful include but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylatei butylamine nitrile; nitrouread; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful.

Additional materials conventionally included in golf ball cover compositions may be added to the compositions of the invention to enhance the formation of golf ball covers. These additional materials include, but are not limited to, dyes, whitening agents, pigments, UV absorbers, optical brighteners, processing aids, metal particles, such as metal flakes, metal powders and mixtures thereof, and other conventional additives. Antioxidants, stabilizers, softening agents, plasticizers, including internal and external plasticizers, impact modifiers, toughening agents, foaming agents, fillers, reinforcing materials and compatibilizers can also be added to any composition of the invention. All of these materials, which are well known in the art, are added for their usual purpose in typical amounts.

Nucleating agents may optionally be added to any composition of the invention comprising a non-amorphous polymer or copolymer. For example, nucleating agents are thought to be able to beneficially alter the properties of a polyamide co-component which is not amorphous by changing its semicrystalline nature, such as its degree of crystallinity and the distribution of crystallite sizes. A nucleating agent typically leads to greater uniformity in the rate of crystal growth and in the size, number and type of crystals formed from the molten polyamide. The more uniform crystalline texture produced by the added nucleating agent may result in increased flexural modulus and hardness. Nucleating agents such as finely dispersed silicas may be added in typical amounts, as is known to those with skill in the art.

The compositions of the invention can be reinforced by blending with a wide range of fillers, e.g., glass fibers, inorganic particles and metal particles, as is known to those with skill in the art.

The present invention is further directed to a method of making a golf ball core, an intermediate layer and/or a cover, comprising forming a composition comprising at least one ionomer formed from a sulfonated and/or phosphonated polymer, optionally blended with at least one co-component polymer, suitable for forming into the above golf ball components, and then forming the golf ball component from the composition.

The blends of the invention are formed by combining the polymer components by methods familiar to those in the polymer blending art, for example, with a two roll mill, a Banbury mixer or a single or twin-screw extruder. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type. Preferably, the normally higher-melting polyamide component is first melted in the main extruder and the molten sulfonated and/or phosphonated component is introduced as a side-stream into a main extruder conveying molten polyamide where the two melts are intermixed to form a blend.

Conventional equipment used in the production of golf balls may be used to form the golf balls of the invention in a manner well known to those skilled in the art. For example, golf balls comprising the cover compositions of the invention can be made by injection molding cover stock formed from a co-component polymer-sulfonated and/or phosphonated ionomer blend of the invention around a core or by compression molding pre-formed half-shells of the cover stock into a ball mold in a conventional manner. Furthermore, golf ball intermediate layers comprising the intermediate layer compositions of the invention can be made by injection molding intermediate layer stock formed from a co-component polymer-sulfonated and/or phosphonated polymer blend of the invention around a core or by compression molding pre-formed half-shells of the intermediate layer stock into a ball mold in a conventional manner, then covered by a layer comprising cover stock as described above, to form a multilayer golf ball.

After molding, golf balls comprising the golf ball compositions of the invention can be finished by buffing, painting, and stamping.

The properties such as hardness, modulus, core diameter, intermediate layer thickness and cover layer thickness of the golf balls of the present invention have been found to effect play characteristics such as spin, initial velocity and feel of the present golf balls.

In particular, the diameter of the core of the present invention in from about 1.000 inches to about 1.630 inches. Preferably the diameter of the core is from about 1.300 inches to about 1.600 inches. More preferably, the diameter of the core is from about 1.390 inches to about 1.580 inches. The thickness of an intermediate layer of the invention, when present, is from about 0.0020 inches to about 0.100 inches. Preferably, the thickness of the intermediate layer is from about 0.030 inches to about 0.090 inches. More preferably, the thickness of the intermediate layer is from about 0.020 inches to about 0.090 inches. Most preferably, the thickness of the intermediate layer is from about 0.030 inches to about 0.060 inches. Furthermore, the thickness of the cover layer of the present invention is from about 0.030 inches to about 0.120 inches. Preferably, the thickness of the cover layer is from about 0.040 inches to about 0.100 inches. Most preferably, the thickness of the cover layer is from about 0.050 inches to about 0.090 inches. Preferably, the overall diameter of the core and all intermediate layers is from about 80% to about 98% of the overall diameter of the finished ball, and is preferably from about 1.680 inches to about 1.780 inches.

The present multilayer golf ball can have an overall diameter of any size. Although the "Rules of Golf" by the United States Golf Association (hereafter "USGA") limit the minimum size of a competition golf ball to 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is from about 1.680 inches to about 1.740 inches.

Several physical properties such as hardness and modulus of the various layers of the golf balls of the present invention are believed to impact the playing characteristics of such golf balls. For example, the flexural and/or tensile modulus of the intermediate layer are believed to have an effect on the "feel" of the golf balls of the present invention. Accordingly, it is preferable that the golf balls of the present invention have an intermediate layer with a flexural modulus of from about 500 psi to about 500,000 psi. More preferably, the flexural modulus of the intermediate layer is from about 1,000 psi to about 250,000 psi. Most preferably, the flexural modulus of the intermediate layer is from about 2,000 psi to about 200,000 psi.

Similarly, it is preferable that the golf balls of the present invention have a cover layer with a flexural modulus from about 10,000 psi to about 150,000 psi. More preferably, the flexural modulus of the cover layer is from about 15,000 psi to about 120,000 psi. Most preferably, the flexural modulus of the cover layer is from about 18,000 psi to about 110,000 psi.

The golf ball compositions of the present invention have a core hardness from about 50 Shore A to about 90 Shore D. Preferably, the core has a Shore D hardness from about 30 to about 65. More preferably, the core has a Shore D hardness from about 35 to about 60. An intermediate layer of the golf balls of the present invention preferably has a hardness of from about 60 Shore A to about 85 Shore D. More preferably, the hardness of an intermediate layer is from about 65 Shore A to about 80 Shore D. The cover layer of the golf balls of the present invention preferably has a Shore D hardness from about 40 to about 90. More preferably, the Shore D hardness of the cover layer is from about 45 to about 85. Most preferably, the cover layer has a Shore D hardness from about 50 to about 80.

Forming a golf ball forming composition from at least one sulfonated and/or phosphonated ionomer dramatically improves the ability to control the mechanical properties of the composition, including tensile and flexural modulus and Shore hardness.

The compositions of the invention provide golf balls and covers having the durability and distance of ionomer covered golf balls and the feel, click and control of balata covered three-piece balls.

The contents of all patents cited herein are incorporated by reference in their entirety.

I claim:

1. A golf ball comprising a cover and a core layer, wherein the cover is formed of a composition consisting essentially of at least one ionomer formed from a polymer having moieties selected from the group consisting of sulfonate, phosphonate and mixtures thereof, and wherein the polymer is a thermoplastic polymer and comprises at least one of polyolefins, polycarbonates, polyamides, polyphenylene oxides, imidized, amino group containing polymers, polyether ketones, polysulfones, poly(phenylene sulfide), poly (ether imide), reinforced engineering plastics, poly(N-octadecylacrylamide), poly(octadecyl methacrylate), poly (ethylene oxide), poly(oxymethylene), poly(silazane), poly (fiuran tetracarboxylic acid diimide), poly(acrylonitrile), poly(alkyl)alkylacrylates, polyesters, poly(styrene), poly(α-methylstyrene), poly(4-dodecylstyrene), poly(4-tetradecylstyrene), acrylic-styrene-acrylonitrile copolymer, acrylonitrile-butadiene-styrene copolymer, high impact polystyrene, a copolymer consisting essentially of a styrene or an α-alkyl styrene monomer, a vinyloxazoline or a 1-alkyl vinyloxazoline monomer, wherein the alkyl groups range, independently from methyl to decyl inclusive and may be linear or branched, a terpolymer consisting essentially of a styrene or an α-alkyl stene monomer, an alkyl acrylate or an alkyl alkylacrylate monomer, or a vinyloxazoline or a 1-alkyl vinyloxazoline monomer, wherein the alkyl groups range, independently, from methyl to decyl inclusive and may be linear or branched and the sulfonated thermoplastic polymer contains from about 0.1 mol % to about 30 mol % sulfonate moieties.

2. The golf ball of claim 1, wherein the ionomer is a reaction product of a metal base and the sulfonated and/or phosphonated polymer and the composition further consists essentially of at least one co-component polymer in a blend with the at least one ionomer.

3. The golf ball of claim 2, wherein the metal base comprises at least one metallic cation selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, and mixtures thereof.

4. The golf ball of claim 1, wherein from about 1 mol % to about 90 mol % of the sulfonate and/or phosphonate moieties of the ionomer are present in an ionic form.

5. The golf ball of claim 4, wherein at least about 10 mol % of the sulfonate and/or phosphonate moieties of the ionomer are present in an ionic form.

6. The golf ball of claim 1, wherein the sulfonated theremoplastic polymer has a flexural modulus of from about 3,000 psi to about 500,000 psi.

7. The golf ball of claim 6, wherein the sulfonated thermoplastic polymer is selected from the group consisting of an olefinic polymer, a polyamide, a polyester, a polymer comprising styrene, a poly(alkyl)alkylacrylate, a polycarbonate, a polyphenylene oxide, a polyether ketone, a polysulfone, a poly(phenylene sulfide), a poly(ether imide), a reinforced engineering plastics comprising an aromatic moiety, and mixtures thereof.

8. The golf ball of claim 2, wherein the co-component is selected from the group consisting of conventional ionomers, non-ionomer thermoplastic elastomers, non-ionomer thermoplastic polymers, non-ionomer thermoset polymers and mixtures thereof.

9. The golf ball of claim 8, wherein the non-ionomer thermoplastic elastomer is selected from the group consisting of a block copoly(ester-ester), a block copoly(ester-ether), a block copoly(amide-ester), a block copoly(amide-ether), a block copoly(urethane-ester), a block copoly (urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

10. The golf ball of claim 8, wherein the non-ionomer thermoplastic polymer comprises at least one olefinic polymer.

11. The golf ball of claim 8, wherein the thermoplastic polymer is selected from the group consisting of poly (amide), poly(ethylene terephthalate), poly(butylene terephthalate), poly(trimethylene terephthalate), poly (ethylene naphthalate), poly(vinyl alcohol), poly(vinyl acetate), poly(silane), poly(vinylidene fluoride), acrylonitrile-butadiene-styrene copolymer, their copolymers, and mixtures thereof.

12. The golf ball of claim 8, wherein the non-ionomer thermoplastic polymer is a polyamide polymer having a flexural modulus of from about 3,000 psi to about 500,000 psi.

13. The golf ball of claim 12, wherein the polyamide polymer is selected from the group consisting of polyamide homopolymers, polyamide copolymers, and mixtures thereof.

14. The golf ball of claim 13, wherein the polyamide homopolymer is selected from the group consisting of polyamide 6, polyamide 11, polyamide 12, polyamide 4,6, polyamide 6,6, polyamide 6,9, polyamide 6,10, polyamide 6,12, and mixtures thereof.

15. The golf ball of claim 13, wherein the polyamide copolymer is selcted from the group consisting of polyamide 6/6,6, polyamide 6,6/6,10, polyamide 6/6,T, polyamide 6/6, 6/6,10, and mixtures thereof.

16. The golf ball of claim 8, wherein the conventional ionomer comprises a copolymer of a mono-olefin with from about 1 wt. % to about 50% of at least one comonomer selected from the group consisting of unsaturated mono- or di-carboxylic acids having 3 to 12 carbon atoms and esters thereof, and wherein from about 10% to about 90% of the carboxylic acid moieties are neutralized by a cation.

17. The golf ball of claim 16, wherein the conventional ionomer comprises a copolymer of ethylene, a softening comonomer present in an amount of from 0 wt. % to about 50 wt. % of the polymer and selected from the group consisting of an alkyl acrylate, alkyl methacrylate and mixtures thereof, and an acid present in an amount from about 5 wt. % to about 35 wt. % of the polymer and selected from the group consisting of acrylic acid, methacrylic acid and mixtures thereof, wherein the acid moiety is neutralized from about 1% to about 90% by at least one said cation.

18. The golf ball of claim 17, wherein the conventional iono-mer comprises a copolymer of ethylene and from about 17 wt. % to about 20 wt. % of methacrylic acid, and wherein from about 35% to about 65% of the carboxylic acid moieties are neutralized by Li, Na, Mg, Zn, K, Ti, Zr, Pt or a mixture thereof.

19. The golf ball of claim 8, wherein the thermoset polymer is selected from the group consisting of poly (isoprene), poly(butadiene), poly(octenemer), styrene-butadiene rubber, ethylene-propylene-diene terpolymer rubber, ethylene-propylene copolymer rubber, nitrile rubber, butyl rubber, poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly (ester), phenolic resin, epoxy resin, alkyd resin, allyl resin, furane resin and mixtures thereof.

20. A golf ball comprising a cover, a core layer and at least one intermediate layer interposed between the cover and the core layer wherein the core layer is formed of a composition which comprises at least one ionomer formed from a polymer having moieties selected from the group consisting of sulfonate, phosphonate and mixtures thereof.

21. A golf ball comprising a cover, a core layer and at least one intermediate layer interposed between the cover and the core layer, wherein at least one intermediate layer is formed of a composition which comprises at least one ionomer formed from a polymer having moieties selected from the group consisting of sulfonate, phosphonate, and mixtures thereof.

22. The golf ball of claim 21, wherein the polymer is a thermoplastic polymer comprising at least one of polyolefins, polycarbonates, polyamides, polyphenylene oxides, imidized, amino group containing polymers, polyether ketones, polysulfones, poly(phenylene sulfide), poly (ether imide), reinforced engineering plastics, poly(N-octadecylacrylamide), poly(octadecyl methacrylate), poly (ethylene oxide), poly(oxymethylene), poly(silazane), poly (furan tetracarboxylic acid diimide), poly(acrylonitrile), poly(alkyl)alkylacrylates, polyesters, poly(styrene), poly($\alpha$-methylstyrene), poly(4-dodecylstyrene), poly(4-tetradecylstyrene), acrylic-styrene-acrylonitrile copolymer, acrylonitrile-butadiene-styrene copolymer, high impact polystyrene, a copolymer consisting essentially of a styrene or an $\alpha$-alkyl styrene monomer, or a vinyloxazoline or a 1-alkyl vinyloxazoline monomer, wherein the alkyl groups range, independently, from methyl to decyl inclusive and may be linear or branched, a terpolymer consisting essentially of a styrene or an $\alpha$-alkyl styrene monomer, an alkyl acrylate or an alkyl alkylacrylate monomer, or a vinyloxazoline or a 1-alkyl vinyloxazoline monomer, wherein the alkyl groups range, independently, from methyl to decyl inclusive and may be linear or branched and the sulfonated thermoplastic polymer contains from about 0.1 mol % to about 30 mol % sulfonate moieties, and blends thereof.

23. The golf ball of claim 21, wherein the ionomer is formed from a thermoplastic elastomer polymer having a flexural modulus of from about 1,000 psi to about 150,000 psi.

24. The golf ball of claim 21, wherein the polymer is a thermoplastic elastomer selected from the group consisting of a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

25. The golf ball of claim 24, wherein the sulfonated thermoplastic polymer has a flexural modulus of from about 3,000 psi to about 500,000 psi.

26. A golf ball comprising a cover and a core, wherein the cover is formed of a composition consisting essentially of at least one ionomer formed from a polymer having moieties selected from the group consisting of sulfonate, phosphonate and mixtures thereof, with the proviso that the polymer is not a nonpolar sulfonated thermoplastic elastomer or a nonpolar thermoset polymer.

27. The golf ball of claim 26, wherein the ionomer is a reaction product of a metal base and the sulfonated and/or phosphonated polymer.

28. The golf ball of claim 26, wherein from about 1 mol % to about 90 mol % of the sulfonate and/or phosphonate moieties of the ionomer are present in an ionic form.

29. The golf ball of claim 28, wherein at least about 10 mol % of the sulfonate and/or phosphonate moieties of the ionomer are present in an ionic form.

30. The golf ball of claim 26, wherein the polymer is a sulfonated polymer selected from the group consisting of sulfonated thermoplastic elastomers, sulfonated thermoplastic polymers, sulfonated thermoset polymers and mixtures thereof.

31. The golf ball of claim 30, wherein the sulfonated polymer contains from about 0.1 mol % to about 30 mol % sulfonate moieties.

32. The golf ball of claim 30, wherein the sulfonated thermoplastic elastomer has a flexural modulus of from about 1,000 psi to about 150,000 psi.

33. The golf ball of claim 32, wherein the sulfonated thermoplastic elastomer is selected from the group consisting of a block copoly(ester-ester), a block copoly(ester-ether), a block copoly(amide-ester), a block copoly(amide-ether), a block copoly(urethane-ester), a block copoly (urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

34. The golf ball of claim 30, wherein the sulfonated thermoplastic polymer has a flexural modulus of from about 3,000 psi to about 500,000 psi.

35. The golf ball of claim 34, wherein the sulfonated thermoplastic polymer is selected from the group consisting of an olefinic polymer, a polyamide, a polyester, a polymer comprising styrene, a poly(alkyl)alkylacrylate, a polycarbonate, a polyphenylene oxide, a polyether ketone, a polysulfone, a poly(phenylene sulfide), a poly(ether imide), a reinforced engineering plastics comprising an aromatic moiety, and mixtures thereof.

36. The golf ball of claim 30, wherein the sulfonated thermoset polymer has a flexural modulus of from about 1,000 psi to about 150,000 psi.

37. The golf ball of claim 36, wherein the sulfonated thermoset polymer is selected from the group consisting of poly(isoprene), poly(butadiene), poly(octenemer), styrene-butadiene rubber, ethylene-propylene-diene terpolymer rubber, ethylene-propylene copolymer rubber, nitrile rubber, butyl rubber, poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin and mixtures thereof.

38. The golf ball of claim 26, wherein said composition consists essentially of a blend of from about 99 wt. % to about 1 wt. % of said at least one ionomer formed from a sulfonated and/or phosphonated polymer and from about 1 wt. % to about 99 wt. % of at least one co-component polymer.

39. The golf ball of claim 38, wherein the co-component polymer is selected from the group consisting of conventional ionomers, non-ionomer thermoplastic elastomers, non-ionomer thermoplastic polymers, non-ionomer polar thermoset polymers and mixtures thereof.

40. The golf ball of claim 39, wherein the non-ionomer thermoplastic elastomer is selected from the group consisting of a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

41. The golf ball of claim 39, wherein the non-ionomer thermoplastic polymer comprises at least one olefinic polymer.

42. The golf ball of claim 39, wherein the non-ionomer thermoplastic polymer is selected from the group consisting of poly(amide), poly(ethylene terephthalate), poly(butylene terephthalate), poly(trimethylene terephthalate), poly(ethylene naphthalate), poly(vinyl alcohol), poly(vinyl acetate), poly(silane), poly(vinylidene fluoride), acrylonitrile-butadiene-styrene copolymer, their copolymers, and mixtures thereof.

43. The golf ball of claim 39, wherein the non-ionomer thermoplastic polymer is a polyamide polymer having a flexural modulus of from about 3,000 psi to about 500,000 psi.

44. The golf ball of claim 43, wherein the polyamide polymer is selected from the group consisting of polyamide homopolymers, polyamide copolymers, and mixtures thereof.

45. The golf ball of claim 44, wherein the polyamide nomopolymer is selected from the group consisting of polyamide 6, polyamide 11, polyamide 12, polyamide 4,6, polyamide 6,6, polyamide 6,9, polyamide 6,10, polyamide 6,12, and mixtures thereof.

46. The golf ball of claim 44, wherein the polyamide copolymer is selected from the group consisting of polyamide 6/6,6, polyamide 6,6/6,10, polyamide 6/6,T, polyamide 6/6,6/6,10, and mixtures thereof.

47. The golf ball of claim 39, wherein the conventional ionomer comprises a copolymer of a mono-olefin with from about 1 wt. % to about 50% of at least one comonomer selected from the group consisting of unsaturated mono- or di-carboxylic acids having 3 to 12 carbon atoms and esters thereof, and wherein from about 10% to about 90% of the carboxylic acid moieties are neutralized by a cation.

48. The golf ball of claim 47, wherein the cation is selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, and mixtures thereof.

49. The golf ball of claim 47, wherein the conventional ionomer comprises a copolymer of ethylene, a softening comonomer present in an amount of from 0 wt. % to about 50 wt. % of the polymer and selected from the group consisting of an alkyl acrylate, alkyl methacrylate and mixtures thereof, and an acid present in an amount from about 5 wt. % to about 35 wt. % of the polymer and selected from the group consisting of acrylic acid, methacrylic acid and mixtures thereof, wherein the acid moiety is neutralized from about 1% to about 90% by at least one said cation.

50. The golf ball of claim 49, wherein the conventional ionomer comprises a copolymer of ethylene and from about 17 wt. % to about 20 wt. % of methacrylic acid, and wherein from about 35% to about 65% of the carboxylic acid moieties are neutralized by Li, Na, Mg, Zn, K, Ti, Zr, Pt or a mixture thereof.

51. The golf ball of claim 39, wherein the non-ionomer polar thermoset polymer is selected from the group consisting of poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin and mixtures thereof.

52. A golf ball comprising a cover and a core, wherein the cover is formed of a composition comprising a polymeric component, wherein the polymeric component consists essentially of at least one sulfonated ionomer formed from a sulfonated polar thermoplastic elastomer.

53. The golf ball of claim 52, wherein the ionomer is a reaction product of a metal base and the sulfonated polar thermoplastic elastomer.

54. The golf ball of claim 53, wherein the metal base comprises at least one metallic cation selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, and mixtures thereof.

55. The golf ball of claim 52, wherein from about 1 mol % to about 90 mol % of the sulfonate moieties of the sulfonated ionomer are present in an ionic form.

56. The golf ball of claim 55, wherein at least about 10 mol % of the sulfonate moieties of the sulfonated ionomer are present in an ionic form.

57. The golf ball of claim 52, wherein the sulfonated ionomer contains from about 0.1 mol % to about 30 mol % sulfonate moieties.

58. The golf ball of claim 52, wherein the sulfonated polar thermoplastic elastomer has a flexural modulus of from about 1,000 psi to about 150,000 psi.

59. The golf ball of claim 58, wherein the sulfonated polar thermoplastic elastomer is selected from the group consisting of a block copoly(ester-ester), a block copoly(ester-ether), a block copoly(amide-ester), a block copoly(amide-ether), a block copoly(urethane-ester), a block copoly (urethane-ether), a block polystyrene thermoplastic elastomer comprising a functionalized substantially saturated rubber, a thermoplastic and elastomer blend wherein the elastomer is not vulcanized and the thermoplastic comprises polyvinylchloride, a halogenated polyolefin comprising propylene and mixtures thereof, a melt-bondable thermoplastic and elastomer blend wherein the rubber is dynamically vulcanized, and mixtures thereof.

60. A golf ball comprising a cover and a core, wherein the cover is formed of a composition comprising polymeric components, wherein said polymeric components consist essentially of a blend of from about 1 wt. % to about 99 wt. % of at least one ionomer formed from a sulfonated polar thermoplastic elastomer and from about 99 wt. % to about 1 wt. % of at least one co-component polymer.

61. The golf ball of claim 60, wherein the co-component polymer is selected from the group consisting of conventional ionomers, non-ionomer thermoplastic elastomers, non-ionomer thermoplastic polymers, non-ionomer polar thermoset polymers and mixtures thereof.

62. The golf ball of claim 61, wherein the non-ionomer thermoplastic elastomer is selected from the group consisting of a block copoly(ester-ester), a block copoly(ester-ether), a block copoly(amide-ester), a block copoly(amide-ether), a block copoly(urethane-ester), a block copoly (urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

63. The golf ball of claim 61, wherein the non-ionomer thermoplastic polymer comprises at least one olefinic polymer.

64. The golf ball of claim 61, wherein the thermoplastic polymer is selected from the group consisting of poly (amide), poly(ethylene terephthalate), poly(butylene terephthalate), poly(trimethylene terephthalate), poly (ethylene naphthalate), poly(vinyl alcohol), poly(vinyl acetate), poly(silane), poly(vinylidene fluoride), acrylonitrile-butadiene-styrene copolymer, their copolymers, and mixtures thereof.

65. The golf ball of claim 61, wherein the non-ionomer thermoplastic polymer is a polyamide polymer having a flexural modulus of from about 3,000 psi to about 500,000 psi.

66. The golf ball of claim 65, wherein the polyamide polymer is selected from the group consisting of polyamide homopolymers, polyamide copolymers, and mixtures thereof.

67. The golf ball of claim 66, wherein the polyamide homopolymer is selected from the group consisting of polyamide 6, polyamide 11, polyamide 12, polyamide 4,6, polyamide 6,6, polyamide 6,9, polyamide 6,10, polyamide 6,12, and mixtures thereof.

68. The golf ball of claim 66, wherein the polyamide copolymer is selected from the group consisting of polyamide 6/6,6, polyamide 6,6/6,10, polyamide 6/6,T, polyamide 6/6,6/6,10, and mixtures thereof.

69. The golf ball of claim 61, wherein the conventional ionomer comprises a copolymer of a mono-olefin with from about 1 wt. % to about 50% of at least one comonomer selected from the group consisting of unsaturated mono- or di-carboxylic acids having 3 to 12 carbon atoms and esters thereof, and wherein from about 10% to about 90% of the carboxylic acid moieties are neutralized by a cation.

70. The golf ball of claim 69, wherein the cation is selected from the group consisting of Li, Na, K, Rb, Cs, Mg, Ca, Sr, Ba, Zn, Cd, Hg, La, Ti, Zr, V, Cr, Mo, W, Mn, Fe, Ru, Os, Co, Rh, Ni, Pd, Pt, Cu, Ag, B, Al, Sn, Pb, and mixtures thereof.

71. The golf ball of claim 69, wherein the conventional ionomer comprises a copolymer of ethylene, a softening comonomer present in an amount of from 0 wt. % to about 50 wt. % of the polymer and selected from the group consisting of an alkyl acrylate, alkyl methacrylate and mixtures thereof, and an acid present in an amount from about 5 wt. % to about 35 wt. % of the polymer and selected from the group consisting of acrylic acid, mathacrylic acid and mixtures thereof, wherein the acid moiety is neutralized from about 1% to about 90% by at least one said cation.

72. The golf ball of claim 71, wherein the conventional ionomer comprises a copolymer of ethylene and from about 17 wt. % to about 20 wt. % of methacrylic acid, and wherein from about 35% to about 65% of the carboxylic acid moieties are neutralized by Li, Na, Mg, Zn, K, Ti, Zr, Pt or a mixture thereof.

73. The golf ball of claim 61, wherein the non-ionomer polar thermoset polymer is selected from the group consisting of poly(chloroprene), poly(urethane), poly(urea), poly (siloxane), chlorotrifluoroethylene copolymer rubber, vinylidene fluoride-hexafluoropropylene copolymer rubber, polysulfide rubber, epichlorohydrin rubber, unsaturated poly (ester), phenolic resin, epoxy resin, alkyd resin, allyl resin, furane resin and mixtures thereof.

74. A golf ball comprising a cover layer, a core layer and at least one intermediate layer interposed between the cover and the core layer, wherein at least one of said layers is formed of a composition which comprises at least one ionomer formed from a polymer having moieties selected from the group consisting of phosphonate, phosphonate and sulfonate, and mixtures thereof.

75. The golf ball of claim 74, wherein the ionomer is formed from a thermoplastic elastomer polymer having a flexural modulus of from about 1,000 psi to about 150,000 psi.

76. The golf ball of claim 75, wherein the thermoplastic elastomer polymer is selected from the group consisting of a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic and elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, and mixtures thereof.

77. The golf ball of claim 74, wherein the ionomer is formed from a nonpolar thermoset polymer having a flexural modulus of from about 1,000 psi to about 150,000 psi.

78. The golf ball of claim 77, wherein the nonpolar thermoset polymer is selected from the group consisting of poly(isoprene), poly(butadiene), poly(octenemer), styrene-butadiene rubber, ethylene-propylene-diene terpolymer rubber, ethylene-propylene copolymer rubber, nitrile rubber, butyl rubber, and mixtures thereof.

* * * * *